(12) United States Patent
Yajima et al.

(10) Patent No.: US 7,065,788 B2
(45) Date of Patent: Jun. 20, 2006

(54) ENCRYPTION OPERATING APPARATUS AND METHOD HAVING SIDE-CHANNEL ATTACK RESISTANCE

(75) Inventors: Jun Yajima, Kawasaki (JP); Kouichi Itoh, Kawasaki (JP); Masahiko Takenaka, Kawasaki (JP); Naoya Torii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 796 days.

(21) Appl. No.: 10/278,838

(22) Filed: Oct. 24, 2002

(65) Prior Publication Data

US 2003/0133567 A1   Jul. 17, 2003

(30) Foreign Application Priority Data

Jan. 15, 2002   (JP)   ............................ 2002-006404

(51) Int. Cl.
  *G06F 1/24*   (2006.01)
(52) U.S. Cl. .............................. 726/23; 726/26; 726/28
(58) Field of Classification Search .................. 726/23, 726/26, 28
  See application file for complete search history.

(56) References Cited

U.S. PATENT DOCUMENTS

| | | | | |
|---|---|---|---|---|
| 4,723,284 A | * | 2/1988 | Munck et al. ............... | 713/159 |
| 4,979,832 A | * | 12/1990 | Ritter ........................... | 380/28 |
| 5,048,086 A | * | 9/1991 | Bianco et al. ................ | 380/28 |
| 5,142,577 A | * | 8/1992 | Pastor ......................... | 705/62 |

OTHER PUBLICATIONS

Kocher, Paul C., "Timing Attacks on Implementations of Diffie-Hellman, RSA, DSS, and Other Systems", *Advances in Cryptology-CRYPTO '96*, Lecture Notes in Computer Science, vol. 1109, Springer-Verlag, pp. 104-113.

Kocher, Paul, et al., "Differential Power Analysis", *Advances in Cryptology-CRYPTO '99*, Lecture Notes in Computer Science, vol. 1666, Springer-Verlag, pp. 388-397.

Okamoto, Eiji, "Power Remainder Operation Using Chinese Remainder Theorem; Introduction to Encryption Theory", published Kyoritsu Shuppan, 1993, pp. 96-97 (with English language translation).

Menezes, A.J., "Handbook of Applied Cryptography", CRC press, 1997, pp. 612-613.

Montgomery, Peter L., "Modular Multiplication Without Trial Division", Mathematics of Computation 44, No. 170, 1985pp. 519-521.

(Continued)

*Primary Examiner*—Thomas R. Peeso
(74) *Attorney, Agent, or Firm*—Staas & Halsey LLP

(57) ABSTRACT

Ciphertext X and a constant C having relationships C>p and C>q with respect to secret keys p and q are input, and correction values $C^{-dp}$ and $C^{-dq}$ (dp=d mod (p−1), dq=d mod (q−1)) are obtained. Then, the ciphertext X is multiplied by the constant C. A remainder operation using the secret key p or q as a remainder value is conducted with respect to the multiplication result. A modular exponentiation operation based on a Chinese remainder theorem is conducted with respect to the remainder operation result, and a correction operation using a correction value $C^{-dp}$ or $C^{-dq}$ is conducted. Thereafter, plaintext Y before being encrypted is calculated.

35 Claims, 11 Drawing Sheets

OTHER PUBLICATIONS

Itoh, K., et al., "Fast Implementation of Public-Key Cryptography on a DSP TMS320C6201", *Y.Kurihara-Cryptographic Hardware and Embedded Systems, CHES '99* Lecture Notes in Computer Science, vol. 1717, Springer-Verlig, pp. 61-72.

Schindler, Werner, "A Timing Attack Against RSA with the Chinese Remainder Theorem", Cryptographic Hardware And Embedded Systems, 2nd International Workshop, CHES 200, Worchester MA, Aug. 17-18, 2000, Proceedings, Lecture Notes In Computer Science, Berlin: Springer, DE, vol. 1965, Aug. 17, 2000, pp. 109-124.

Walter, C.D., "Mongomery Exponentiation Needs No Final Substractions", Electronics Letters, IEE Stevenage, GB, vol. 35, No. 21, Oct. 14, 1999.

\* cited by examiner

ENCRYPTION OPERATING APPARATUS AND METHOD HAVING SIDE-CHANNEL ATTACK RESISTANCE

BACKGROUND OF THE INVENTION

1. Field of the Invention

The present invention relates to an encryption operating apparatus and method having side-channel attack resistance, which is secure with respect to analysis of a secret key in an encryption processor using side-channel attack and is capable of conducting operation processing with respect to decoding processing at a high speed.

2. Description of the Related Art

Due to the recent development of a computer network, chances of searching for a database and transmitting/receiving electronized information such as electronic mail and electronic news via a network are increasing rapidly. Furthermore, service such as on-line shopping is being provided using the network.

However, as service involving transfer of money is increased, a new problem such as an increase in so-called network crime (tapping and tampering of electronized data on a network, enjoying service by pretending to be another person, etc.) has been pointed out. Particularly in a wireless network environment, it is easy to intercept communication, so that there is a great demand for measures for preventing such an act in particular.

In order to solve the above-mentioned problem, encrypted electronic mail using an encryption technology, a user authentication system using an electronic signature, etc. have been proposed and are being introduced into various networks. In view of this, an encryption technology or an electronic signature generation technique is considered as one of indispensable techniques in a computer network environment.

Along with the advancement of such an encryption technology or an electronic signature generation technique, a method for attacking it is also being advanced rapidly. For example, side-channel attack is an attack method for measuring a processing time and a power consumption of an encryption processor, and analyzing a secret key of a code based on the features of the measured processing time and power consumption. Typically, timing attack or SPA (Simple Power Analysis) are known.

If the timing attack or SPA is used for an encryption scheme containing a remainder operation, the relationship in magnitude between an input value and a remainder value can be determined, so that it is possible to know the remainder value (i.e., the value of a secret key) by conducting a binary search while manipulating the input value.

More specifically, it is determined based on an input value whether or not a remainder operation is conducted, and there is a large difference in processing time and power consumption between the case where a remainder operation is conducted and the case where a remainder operation is not conducted. Therefore, it is possible to determined the relationship in magnitude between the input value and the remainder value by conducting timing attack paying attention to the difference in processing time and SPA paying attention to the difference in power consumption required for an operation.

Therefore, if an attacker (malicious third party) uses the above-mentioned attack method, the third party can reveal the remainder value that is unknown to the third party by repeating a binary search while manipulating an input value. This implies that the third party can know a remainder value that is a secret key, for example, in the case where RSA with Chinese remainder theorem is used, which is considered to be fatal to the security in the encryption technology.

The attack method as described above is also applicable to generation processing of an electronic signature. More specifically, if key information at a time of generation of an electronic signature is analyzed by a third party, the third party can generate the electronic signature arbitrarily, which enables the third party other than a user to easily pretend to be the user. Thus, this fact is considered to be fatal to the security introducing an electronic signature.

Hereinafter, decoding of a code will be exemplified specifically by using numerical expressions. First, the processing of RSA decoding using a general Chinese remainder theorem can be expressed as follows:

$$X_p = X \bmod p$$

$$X_q = X \bmod q$$

$$Y_p = X_p^{dp} \bmod p$$

$$Y_q = X_q^{dq} \bmod q$$

$$Y = (a(Y_q - Y_p) \bmod q)p + Y_p \quad (1)$$

where $a = p^{-1} \bmod q$ $dp = d \bmod(p-1)$ $dq = d \bmod(q-1)$

In Expression 1, d, p, and q represent secret keys, and plaintext Y corresponding to ciphertext X is obtained by $Y = X^d \bmod N$ (N=pq). By using modular exponentiation operations $Y_p$ and $Y_q$ as in Expression 1, the processing time can be shortened to about ¼ compared with the method of directly obtaining $X^d \bmod N$.

When the remainder value p is paid attention to, and an arbitrary input X is input to the first expression $X_p = X \bmod p$ in Expression 1, it is determined whether or not a remainder operation is conducted based on the relationship in magnitude between X and p. More specifically, in the case of $X \geq p$, a remainder operation of X mod p is conducted, and in the case of X<p, a remainder operation is not conducted.

Thus, in the case of using the timing attack, the relationship in magnitude between X and p is determined based on the length of an operation time. That is, in the case where X ($X \geq p$) is input, a remainder operation is conducted, so that the operation time becomes long. On the other hand, in the case where X (X<p) is input, a remainder operation is not conducted, so that the operation time becomes short.

In the case where the operation time is long, a value smaller than X (which has been input) is input, and in the case where the operation time is short, a value larger than X is input. Then, an operation time is measured again. By repeating such processing, an input value X matched with the remainder value p can be obtained finally, which makes it possible to reveal the secret key p.

In the case of using the SPA, the relationship in magnitude between X and p is determined based on the difference in waveform of a power consumption obtained by an operation. More specifically, as shown in FIGS. 1A–1C, assuming that a waveform of a power consumption by an operation A that does not involve a remainder operation is shown in FIG. 1A, and a waveform of a power consumption by an operation B that involves a remainder operation is shown in FIG. 1B, it can be determined from a waveform shown in FIG. 1C of a measured power consumption whether or not the operation B involving a remainder operation has been conducted.

Accordingly, as shown in FIG. 1C, in the case where a waveform of a power consumption by the operation B involving a remainder operation is contained, it can be determined that the input X satisfies X≧p, and in the case where a waveform of a power consumption by the operation B involving a remainder operation is not contained, it can be determined that the input X satisfies X<p. Thus, in the same way as in the timing attack, in the case where a waveform of a power consumption by the operation B involving a remainder operation is contained, a value smaller than X (which has been input) is input, and in the case where a waveform of a power consumption by the operation B involving a remainder operation, a value larger than X is input. Then, a waveform of a power consumption is observed again. By repeating such processing, an input value X matched with the remainder value p can be obtained finally, which enables the secret key p to be revealed.

The input value X matched with the remainder value q can be obtained by using the attack method as described above to the secret key q in a similar manner. Therefore, it is also possible for the third party to know the secret key q.

Various techniques can be considered regarding a method for preventing these attacks. A typical method is to conduct a remainder operation after multiplying input data by a random number. Because of this, whether or not a remainder operation is conducted does not depend upon only the relationship in magnitude between the input data and the remainder value, and whether or not a remainder operation is conducted is determined randomly based on the magnitude of a random value. Therefore, irrespective of whether the timing attack is used or the SPA is used, the remainder value q or p (i.e., a secret key) cannot be revealed.

However, according to the above-mentioned method merely using multiplication of a random number, a considerable time is required for an operation of correction. More specifically, in order to conduct correction processing with respect to multiplication of a random number, it is required to derive an appropriate correction value. However, since a random number is used, it is required to derive a correction value every time a random number is multiplied. Because of this, an operation of deriving a correction value must be conducted every time, which results in a considerable time for operation processing.

For example, in the same way as in Expression 1, the processing of decoding ciphertext into plaintext with RSA using Chinese remainder theorem in the case of using a random number r can be expressed by Expression 2.

$$X_p' = X*r \bmod p$$

$$X_q' = X*r \bmod q$$

$$Y_p = X_p'^{dp} \bmod p$$

$$Y_q = X_q'^{dq} \bmod q$$

$$Y_p' = Y_p * r^{-dP} \bmod p$$

$$Y_q' = Y_q * r^{-dq} \bmod q$$

$$Y = (a(Y_q' - Y_p') \bmod q)p + Y_p' \qquad (2)$$

where $a = p^{-1} \bmod q$
  $dp = d \bmod (p-1)$
  $dq = d \bmod (q-1)$

In Expression 2, d, p, and q represent secret keys, and plaintext Y corresponding to ciphertext X is obtained by $Y = X^d \bmod N$ ($N = pq$). By previously multiplying the input X by the random number r as in Expression 2, whether or not a remainder operation is conducted does not depend upon the relationship in magnitude between the input value X and the remainder value p or q. Unlike Expression 1, it is required to multiply the value of a remainder operation by a correction value $r^{-dp} \bmod p$ or $r^{-dq} \bmod q$ corresponding to each multiplied random number r. This results in an increase in number of operation processing by the time $X^d \bmod N$ to be obtained finally is reached.

SUMMARY OF THE INVENTION

Therefore, with the foregoing in mind, it is an object of the present invention to provide an encryption operating apparatus and method having side-channel attack resistance, which is safe to the attack using side-channel attack such as timing attack and SPA, and can conduct an operation at a high speed.

In order to achieve the above-mentioned object, an encryption operating apparatus having side-channel attack resistance of the present invention includes a modular exponentiation operating part for conducting at least a modular exponentiation operation with respect to ciphertext X that can be decrypted with secret keys p, q and d, wherein plaintext Y before being encrypted is calculated by providing a correction operating part for conducting the modular exponentiation operation after multiplying the ciphertext X by an arbitrary constant having a value larger than the secret keys p and q, and finally conducting a correction operation based on the constant.

More specifically, the encryption operating apparatus includes: a ciphertext input part for inputting ciphertext X that can be decrypted with secret keys p, q and d; a constant storing part for storing a constant C having relationships C>p and C>q with respect to the secret keys p and q; a correction value storing part for storing correction values $C^{-dp}$ and $C^{-dq}$ (dp=d mod (p−1), dq=d mod (q−1)) calculated based on the constant; a constant multiplying part for multiplying the ciphertext X by the constant C stored in the constant storing part; a multiplication result storing part for storing an operation result by the multiplication; a remainder operating part for conducting a remainder operation represented by Expression 3 using the secret key p or q as a remainder value with respect to the operation result by the multiplication stored in the multiplication result storing part; a remainder operation result storing part for storing operation results $X_p'$ and $X_q'$ by the remainder operation; a Chinese remainder RSA processing part for conducting a modular exponentiation operation based on a Chinese remainder theorem represented by Expression 4 with respect to the operation results $X_p'$ and $X_q'$ by the remainder operation stored in the remainder operation result storing part; a modular exponentiation operation result storing part for storing operation results $Y_p$ and $Y_q$ by the modular exponentiation operation; a correction processing part for conducting a correction operation represented by Expression 5 by using the correction value $C^{-dp}$ or $C^{-dq}$ stored in the correction value storing part with respect to the operation results $Y_p$ and $Y_q$ by the modular exponentiation operation stored in the modular exponentiation operation result storing part; a correction result storing part for storing operation results $Y_p'$ and $Y_q'$ by the correction operation; and a plaintext output part for calculating plaintext Y before being encrypted as expressed by Expression 6 based on the operation results $Y_p'$ and $Y_q'$ by the correction operation stored in the correction result storing part, wherein, even in a case where any of the ciphertext X is input, the secret keys p and q cannot be revealed.

$$X_p' = X*C \bmod p$$

$$X_q' = X*C \bmod q \tag{3}$$

$$Y_p = X_p'^{dp} \bmod p$$

$$Y_q = X_q'^{dq} \bmod q \tag{4}$$

$$Y_p' = Y_p * C^{-dp} \bmod p$$

$$Y_q' = Y_q * C^{-dq} \bmod q \tag{5}$$

$$Y = (a(Y_q' - Y_p') \bmod q)p + Y_p' \tag{6}$$

where $a = p^{-1} \bmod q$

Because of the above configuration, even in the case where any input is made, a remainder operation is always conducted. Therefore, the relationship in magnitude between the input value and the secret key p or q cannot be derived based on the difference in operation processing time, a wavelength of a power consumption, and the like, which enables a decoding operating method with high security against side-channel attack to be provided. Furthermore, since a correction value is calculated based on a constant C, an operation for obtaining a correction value only needs to be conducted once, and it can be expected that an operation processing overhead is reduced as a whole.

Next, in order to achieve the above-mentioned object, the encryption operating apparatus having side-channel attack resistance of the present invention includes a modular exponentiation operating part for conducting at least a modular exponentiation operation with respect to ciphertext X that can be decrypted with secret keys p, q and d, wherein plaintext Y before being encrypted is calculated by multiplying the ciphertext X, using a Montgomery parameter having a value larger than the secret keys p and q, as a constant, and conducting the modular exponentiation operation.

More specifically, the above-mentioned encryption operating apparatus having side-channel attack resistance is characterized in that, in a case where a function MONT_EXP for executing a Montgomery modular exponentiation operation is defined by Expression 7, the apparatus includes: a ciphertext input part for inputting ciphertext X that can be decrypted with secret keys p, q and d; a Montgomery parameter multiplying part for multiplying the ciphertext X by a Montgomery parameter R; a multiplication result storing part for storing an operation result by the multiplication; a remainder operating part for conducting a remainder operation represented by Expression 8 using the secret key p or q as a remainder value with respect to the operation result by the multiplication stored in the multiplication result storing part; a remainder operation result storing part for storing operation results $X_p'$ and $X_q'$ by the remainder operation; a Montgomery modular exponentiation operating part for conducting a Montgomery modular exponentiation operation represented by Expression 9 with respect to the operation results $X_p'$ and $X_q'$ by the remainder operation stored in the remainder operation result storing part; a Montgomery modular exponentiation operation result storing part for storing operation results $Y_p$ and $Y_q$ by the Montgomery modular exponentiation operation; and a plaintext output part for calculating plaintext Y before being encrypted as expressed by Expression 10 based on the operation results $Y_p$ and $Y_q$ by the Montgomery modular exponentiation operation stored in the Montgomery modular exponentiation operation result storing part, wherein, even in a case where any of the ciphertext X is input, the secret keys p and q cannot be revealed.

$$R > p$$

$$\text{MONT\_EXP}(X,d,R,p) = (X*R^{-1})^d \bmod p \tag{7}$$

$$X_p' = X*R \bmod p$$

$$X_q' = X*R \bmod q \tag{8}$$

$$Y_p = \text{MONT\_EXP}(X_p', dp, R, p)$$

$$Y_q = \text{MONT\_EXP}(X_q', dq, R, q) \tag{9}$$

where $dp = d \bmod (p-1)$, $dq = d \bmod (q-1)$ $$Y = (a(Y_q' - Y_p') \bmod q)p + Y_p' \tag{10}$$

where $a = p^{-1} \bmod q$

Because of the above configuration, even in the case where any input is made, a remainder operation is always conducted. Therefore, the relationship in magnitude between the input value and the secret key p or q cannot be revealed based on the difference in operation processing time, a wavelength of a power consumption, and the like, which enables a decoding operating method with high security against side-channel attack to be provided. Furthermore, since it is not required to conduct a correction operation, it can be expected that an operation processing overhead is reduced as a whole.

Next, in order to achieve the above-mentioned object, an encryption operating apparatus having side-channel attack resistance of the present invention having a modular exponentiation operating part for conducting at least a modular exponentiation operation with respect to ciphertext X that can be decrypted with secret keys p, q and d includes a Montgomery parameter remainder operating part for conducting a remainder operation to the secret keys p and q with respect to a Montgomery parameter having a value larger than the secret keys p and q, wherein plaintext Y before being encrypted is calculated by multiplying the ciphertext X by an operation result in the remainder operating part, and conducting the modular exponentiation operation.

More specifically, the above-mentioned encryption operating apparatus having side-channel attack resistance is characterized in that, in a case where a function MONT_EXP for executing a Montgomery modular exponentiation operation is defined by Expression 11, the apparatus includes: a ciphertext input part for inputting ciphertext X that can be decrypted with secret keys p, q and d; a Montgomery parameter remainder operation result storing part for storing a result obtained by conducting a remainder operation to a remainder value p or q as represented by Expression 12 with respect to a Montgomery parameter R; a remainder value multiplying part for multiplying the input ciphertext X by an operation result $R_p'$ or $R_q'$ by the remainder operation stored in the Montgomery parameter remainder operation result storing part as represented by Expression 13; a multiplication result storing part for storing operation results $X_p'$ and $X_q'$ by the multiplication; a remainder operating part for successively conducting a remainder operation represented by Expression 14 using the secret keys p and q as remainder values with respect to the operation results $X_p'$ and $X_q'$ by the multiplication stored in the multiplication result storing part; a remainder operation result storing part for storing operation results $X_p$ and $X_q$ by the remainder operation; a Montgomery modular exponentiation operating part for conducting a Montgomery modular exponentiation operation represented by Expression 15 with respect to the operation results $X_p$ and $X_q$ by the remainder operation stored in the remainder operation result storing part; a Montgomery modular exponentiation operation result storing part for storing operation results $Y_p$ and $Y_q$ by the Montgomery modular exponentiation operation; and a plaintext output part for calculating plaintext Y before being encrypted as expressed by Expression 16 based on the operation results $Y_p$ and $Y_q$ by the Montgomery modular exponentiation operation stored in the Montgomery modular exponentiation operation result storing part, wherein, even in a case where any of the ciphertext X is input, the secret keys p and q cannot be revealed.

$$R > p$$

$$\text{MONT\_EXP}(X,d,R,p) = (X*R^{-1})^d \bmod p \quad (11)$$

$$R_p' = R \bmod p$$

$$R_q' = R \bmod q \quad (12)$$

$$X_p' = X*R_p'$$

$$X_q' = X*R_q' \quad (13)$$

$$X_p = X_p' \bmod p$$

$$X_q = X_q' \bmod q \quad (14)$$

$$Y_p = \text{MONT\_EXP}(X_p, d_p, R, p)$$

$$Y_q = \text{MONT\_EXP}(X_q, d_q, R, q) \quad (15)$$

where dp=d mod(p−1), dq=d mod(q−1)

$$Y = (a(Y_q - Y_p) \bmod q)p + Y_p \quad (16)$$

where $a = p^{-1} \bmod q$

Because of the above configuration, whether or not a remainder operation is conducted is determined based on the magnitude of the product between the input value and the Montgomery parameter remainder operation result $R_p'$ or $R_q'$. Therefore, the relationship in magnitude between the input value and the secret key p or q cannot be derived based on the difference in operation processing time, a wavelength of a power consumption, and the like, which enables a decoding operating method with high security against side-channel attack to be provided. Furthermore, since it is not required to conduct a correction operation, it can be expected that an operation processing overhead is reduced as a whole.

Furthermore, the present invention is characterized by a recording medium storing a computer-executable program for implementing an encryption operating method having side-channel attack resistance and the processes thereof, the program including: inputting ciphertext X that can be decrypted with secret keys p, q and d; storing a constant C having relationships C>p and C>q with respect to the secret keys p and q; storing correction values $C^{-dp}$ and $C^{-dq}$ (dp=d mod (p−1), dq=d mod (q−1)) calculated based on the constant; multiplying the ciphertext X by the stored constant C; storing an operation result by the multiplication; conducting a remainder operation represented by Expression 17 using the secret key p or q as a remainder value with respect to the stored operation result by the multiplication; storing operation results $X_p'$ and $X_q'$ by the remainder operation; conducting a modular exponentiation operation based on a Chinese remainder theorem represented by Expression 18 with respect to the stored operation results $X_p'$ and $X_q'$ by the remainder operation; storing operation results $Y_p$ and $Y_q$ by the modular exponentiation operation; conducting a correction operation represented by Expression 19 by using the stored correction value $C^{-dp}$ or $C^{-dq}$ with respect to the stored operation results $Y_p$ and $Y_q$ by the modular exponentiation operation; storing operation results $Y_p'$ and $Y_q'$ by the correction operation; and calculating plaintext Y before being encrypted as expressed by Expression 20 based on the stored operation results $Y_p'$ and $Y_q'$ by the correction operation, wherein, even in a case where any of the ciphertext X is input, the secret keys p and q cannot be revealed.

$$X_p' = X*C \bmod p$$

$$X_q' = X*C \bmod q \quad (17)$$

$$Y_p = X_p'^{dp} \bmod p$$

$$Y_q = X_q'^{dq} \bmod q \quad (18)$$

$$Y_p' = Y_p * C^{-dp} \bmod p$$

$$Y_q' = Y_q * C^{-dq} \bmod q \quad (19)$$

$$Y = (a(Y_q' - Y_p') \bmod q)p + Y_p' \quad (20)$$

where $a = p^{-1} \bmod q$

Because of the above configuration, by loading the program onto a computer for execution, even in the case where any input is made, a remainder operation is always conducted. Therefore, the relationship in magnitude between the input value and the secret key p or q cannot be derived based on the difference in operation processing time, a wavelength of a power consumption, and the like, which enables a decoding operating method with high security against side-channel attack to be provided. Furthermore, a correction value is calculated based on a constant C, so that an operation for obtaining a correction value needs to be conducted once, and an encryption operating apparatus having side-channel attack resistance can be realized in which an operation processing overhead is expected to be reduced as a whole.

Furthermore, the present invention is characterized by a recording medium storing a computer-executable program for implementing an encryption operating method having side-channel attack resistance and processes thereof, wherein, in a case where a function MONT_EXP for executing a Montgomery modular exponentiation operation is defined by Expression 21, the program including: inputting ciphertext X that can be decrypted with secret keys p, q and d; multiplying the ciphertext X by a Montgomery parameter R; storing an operation result by the multiplication; conducting a remainder operation represented by Expression 22 using the secret key p or q as a remainder value with respect to the stored operation result by the multiplication; storing operation results $X_p'$ and $X_q'$ by the remainder operation; conducting a Montgomery modular exponentiation operation represented by Expression 23 with respect to the stored operation results $X_p'$ and $X_q'$ by the remainder operation; storing operation results $Y_p$ and $Y_q$ by the Montgomery modular exponentiation operation; and calculating plaintext Y before being encrypted as expressed by Expression 24 based on the stored operation results $Y_p$ and $Y_q$ by the Montgomery modular exponentiation operation, wherein, even in a case where any of the ciphertext X is input, the secret keys p and q cannot be revealed.

$$R > p$$

$$\text{MONT\_EXP}(X,d,R,p) = (X*R^{-1})^d \bmod p \quad (21)$$

$$X_p' = X*R \bmod p$$

$$X_q' = X*R \bmod q \quad (22)$$

$$Y_p = \text{MONT\_EXP}(X_p',dp,R,p)$$

$$Y_q = \text{MONT\_EXP}(X_q',dq,R,q) \quad (23)$$

where dp=d mod(p−1), dq=d mod(q−1)

$$Y = (a(Y_q' - Y_p') \bmod q) p + Y_p' \quad (24)$$

where $a = p^{-1} \bmod q$

Because of the above configuration, by loading the program onto a computer for execution, even in the case where any input is made, a remainder operation is always conducted. Therefore, the relationship in magnitude between the input value and the secret key p or q cannot be derived based on the difference in operation processing time, a wavelength of a power consumption, and the like, which enables a decoding operating method with high security against side-channel attack to be provided. Furthermore, since it is not required to conduct a correction operation, an encryption operating apparatus having side-channel attack resistance can be realized in which an operation processing overhead is expected to be reduced as a whole.

Furthermore, the present invention is characterized by a recording medium storing a computer-executable program for implementing an encryption operating method having side-channel attack resistance, wherein, in a case where a function MONT_EXP for executing a Montgomery modular exponentiation operation is defined by Expression 25, the program including: inputting ciphertext X that can be decrypted with secret keys p, q and d; storing a result obtained by conducting a remainder operation to a remainder value p or q as represented by Expression 26 with respect to a Montgomery parameter R; multiplying the input ciphertext X by a stored operation result $R_p'$ or $R_q'$ by the remainder operation as represented by Expression 27; storing operation results $X_p'$ and $X_q'$ by the multiplication; successively conducting a remainder operation represented by Expression 28 using the secret keys p and q as remainder values with respect to the stored operation results $X_p'$ and $X_q'$ by the multiplication; storing operation results $X_p$ and $X_q$ by the remainder operation; conducting a Montgomery modular exponentiation operation represented by Expression 29 with respect to the stored operation results $X_p$ and $X_q$ by the remainder operation; storing operation results $Y_p$ and $Y_q$ by the Montgomery modular exponentiation operation; and calculating plaintext Y before being encrypted as expressed by Expression 30 based on the stored operation results $Y_p$ and $Y_q$ by the Montgomery modular exponentiation operation, wherein, even in a case where any of the ciphertext X is input, the secret keys p and q cannot be revealed.

$$R > p$$

$$\text{MONT\_EXP}(X,d,R,p) = (X*R^{-1})^d \bmod p \quad (25)$$

$$R_p' = R \bmod p$$

$$R_q' = R \bmod q \quad (26)$$

$$X_p' = X*R_p'$$

$$X_q' = X*R_q' \quad (27)$$

$$X_p = X_p' \bmod p$$

$$X_q = X_q' \bmod q \quad (28)$$

$$Y_p = \text{MONT\_EXP}(X_p,dp,R,p)$$

$$Y_q = \text{MONT\_EXP}(X_q,dq,R,q) \quad (29)$$

where dp=d mod(p−1), dq=d mod(q−1)

$$Y = (a(Y_q - Y_p) \bmod q) p + Y_p \quad (30)$$

where $a = p^{-1} \bmod q$

Because of the above configuration, by loading the program onto a computer for execution, whether or not a remainder operation is conducted is determined based on the magnitude of the product between the input value and the Montgomery parameter remainder operation result $R_p'$ or $R_q'$. Therefore, the relationship in magnitude between the input value and the secret key p or q cannot be derived based on the difference in operation processing time, a wavelength of a power consumption, and the like, which enables a decoding operating method with high security against side-channel attack to be provided. Furthermore, since it is not required to conduct a correction operation, an encryption operating apparatus having side-channel attack resistance can be realized in which an operation processing overhead is expected to be reduced as a whole.

These and other advantages of the present invention will become apparent to those skilled in the art upon reading and understanding the following detailed description with reference to the accompanying figures.

DESCRIPTION OF THE PREFERRED EMBODIMENTS

Embodiment 1

Hereinafter, an encryption operating apparatus having side-channel attack resistance in Embodiment 1 according to the present invention will be described with reference to the drawings. Embodiment 1 is characterized in that an input X is multiplied by a constant C that is larger than secret keys p and q, instead of being multiplied by a random number r.

More specifically, the input X is multiplied by the constant C that is larger than the secret keys p and q, so that X*C takes a value larger than p and q. This means that a remainder operation with the remainder value p or q is conducted without fail. Therefore, irrespective of whether timing attack or SPA is used, comparison in magnitude between the input value X and the remainder value p or q cannot be conducted.

On the other hand, since C is a constant, it only needs to calculate correction values $C^{-dp}$ and $C^{-dq}$ once. Thus, it is not required to derive a correction value every time a remainder operation is conducted, which can reduce the load of operation processing as a whole.

Because of the above, the encryption operating apparatus can be effectively protected from side-channel attack such as timing attack and SPA, and operation processing can be conducted at a high speed without increasing an operation processing overhead.

Figure 1A:
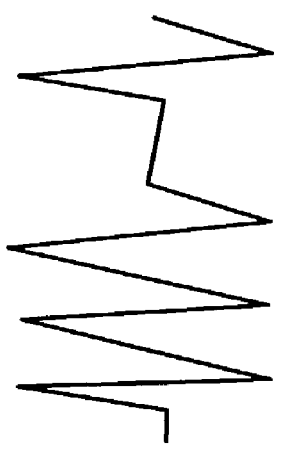
FIGS. 1A to 1C illustrate waveforms of a power consumption.
Figure 1C:
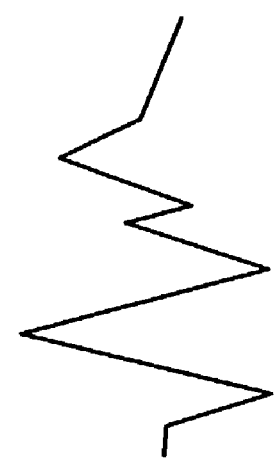
Figure 1B:
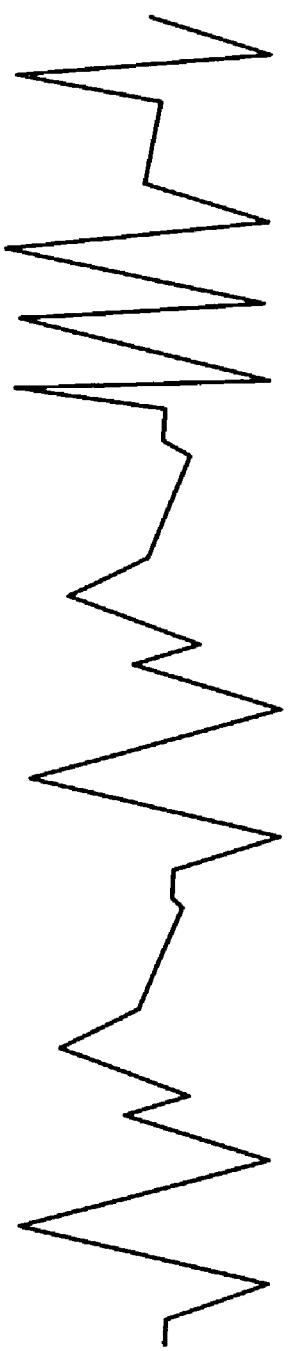
Figure 2:
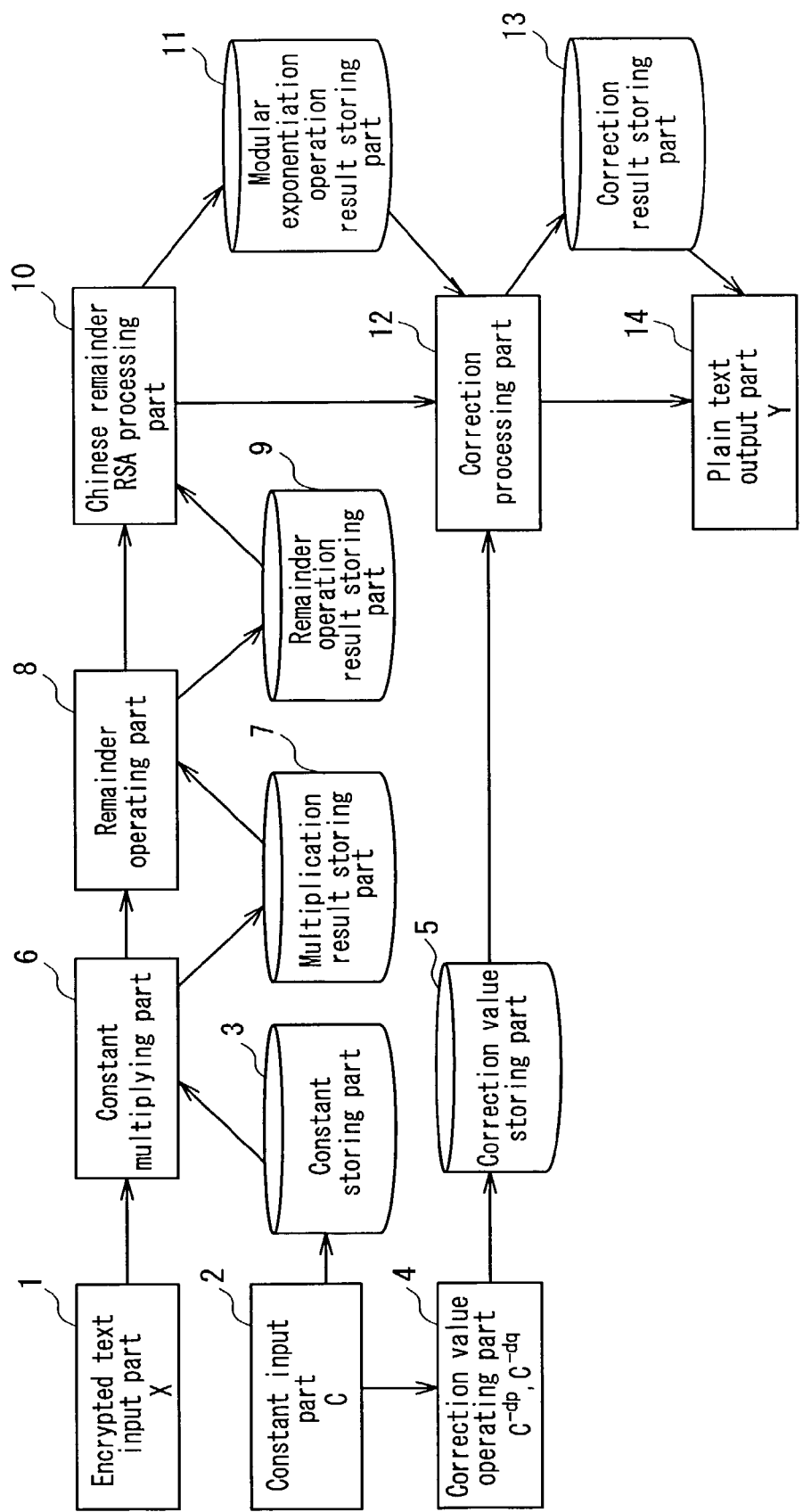
FIG. 2 shows a configuration of an encryption operating apparatus having side-channel attack resistance in Embodiment 1 according to the present invention.

FIG. 2 shows a specific configuration of the encryption operating apparatus having side-channel attack resistance in Embodiment 1 according to the present invention. In Embodiment 1, the case will be described in which decoding in RSA processing with Chinese remainder theorem will be described.

In FIG. 2, reference numeral 1 denotes a ciphertext input part for inputting ciphertext X for decoding. A third party that conducts timing attack or SPA also inputs dummy ciphertext Xd for revealing secret keys through the ciphertext input part 1. The ciphertext X or Xd thus input is transferred to a constant multiplying part 6.

Reference numeral 2 denotes a constant input part for inputting a constant X for multiplying the ciphertext X or the dummy ciphertext Xd input through the ciphertext input part 1. It is assumed that a constant C satisfies the relationships C>p and C>q with respect to secret keys p and q. The input constant C is stored in a constant storing part 3.

It is also considered that the constant input part 2 is not provided. That is, the constant C satisfying the relationships C>p and C>q with respect to the secret keys p and q is previously stored in the constant storing part 3 during implementation, whereby a user is not required to input the constant C. This is because it is considered that the constant C is previously determined during implementation.

Reference 4 denotes a correction value operating part for obtaining correction values $C^{-dp}$ and $C^{-dq}$ required for finally obtaining plaintext. Herein, dp=d mod (p−1) and dq=d mod (q−1), and C is a constant, so that the correction values $C^{-dp}$ and $C^{-dq}$ required for obtaining plaintext finally are also constant values. The calculated correction values $C^{-dp}$ and $C^{-dq}$ are stored in a correction value storing part 5.

Like the constant input part 2, it is also considered that the correction value operating part 4 is not provided. That is, the correction values $C^{-dp}$ and $C^{-dq}$ are previously calculated based on the constant value C stored in the constant storing part 3 and stored in the correction value storing part 5. Because of this, it can be expected to reduce an operation processing overhead.

Reference numeral 6 denotes a constant multiplying part for multiplying the ciphertext X or the dummy ciphertext Xd input through the encrypted input part 1 by the constant C stored in the constant storing part 3. Multiplication of the ciphertext X is conducted as expressed by Expression 31. A result X' obtained by multiplication in Expression 31 is stored in a multiplication result storing part 7.

$$X' = X * C \tag{31}$$

Reference numeral 8 denotes a remainder operating part for conducting remainder operations using the secret keys p and q as remainder values with respect to multiplication results stored in the multiplication result storing part 7. In Embodiment 1, X*C>p and X*C>q always hold from the relationships C>p and C>q. Therefore, the remainder operating part 8 conducts remainder operations even if any input is conducted through the ciphertext input part 1.

The remainder operations in Embodiment 1 can be expressed by Expression 32. $X_p'$ and $X_q'$ that are results of remainder operations calculated by Expression 32 are stored in a remainder operation result storing part 9.

$$X_p' = X' \bmod p$$
$$X_q' = X' \bmod q \tag{32}$$

Reference numeral 10 denotes a Chinese remainder RSA processing part for conducting a modular exponentiation operation based on a Chinese remainder theorem with respect to the results of the remainder operations stored in the remainder operation result storing part 9. Herein, a modular exponentiation operation as expressed by Expression 33 is conducted. Operation results $Y_p$ and $Y_q$ of the modular exponentiation operation expressed by Operation 32 are stored in a modular exponentiation operation result storing part 11.

$$Y_P = X_p'^{dp} \bmod p \tag{33}$$
$$\quad = (X^{dp} * C^{dp}) \bmod p$$
$$Y_q = X_q'^{dq} \bmod q$$
$$\quad = (X^{dq} * C^{dq}) \bmod q$$

Reference numeral 12 denotes a correction processing part for conducting modular exponentiation operations with respect to the input values X and Y, using the previously calculated correction values $C^{-dp}$ and $C^{-dq}$ stored in the correction value storing part 5. The correction operations are expressed by Expression 34. Since C is a constant, the correction values $C^{-dp}$ and $C^{-dq}$ are also constants. It only needs to conduct operation processing for obtaining correction values $C^{-dp}$ and $C^{-dq}$ once. The correction operation values $Y_p'$ and $Y_q'$ are stored in a correction result storing part 13.

$$Y_p' = Y_p * C^{-dp} \bmod p \quad (34)$$
$$= X^{dp} \bmod p$$
$$Y_q' = Y_q * C^{-dq} \bmod q$$
$$= X^{dq} \bmod q$$

Reference numeral 14 denotes a plaintext output part for calculating plaintext Y before being encrypted as represented by Expression 35 with respect to the correction operation values $Y_p'$ and $Y_q'$ corrected in the correction processing part 12 and stored in the correction result storing part 13. In the case where an input value is the dummy ciphertext Xd, an erroneous calculated value is output; however, there is no problem in a calculated value with respect to side-channel attack.

$$Y = (a(Y_q' - Y_p') \bmod q)p + Y_p' \quad (35)$$

where $a = p^{-1} \bmod q$

Because of the above configuration, an authorized user who knows the secret keys p and q can obtain plaintext Y with an operation processing overhead that is substantially the same as that of ordinary operation processing. On the other hand, an attacker who attempts to analyze without authorization cannot obtain the secret keys by side-channel attack.

Figure 3:
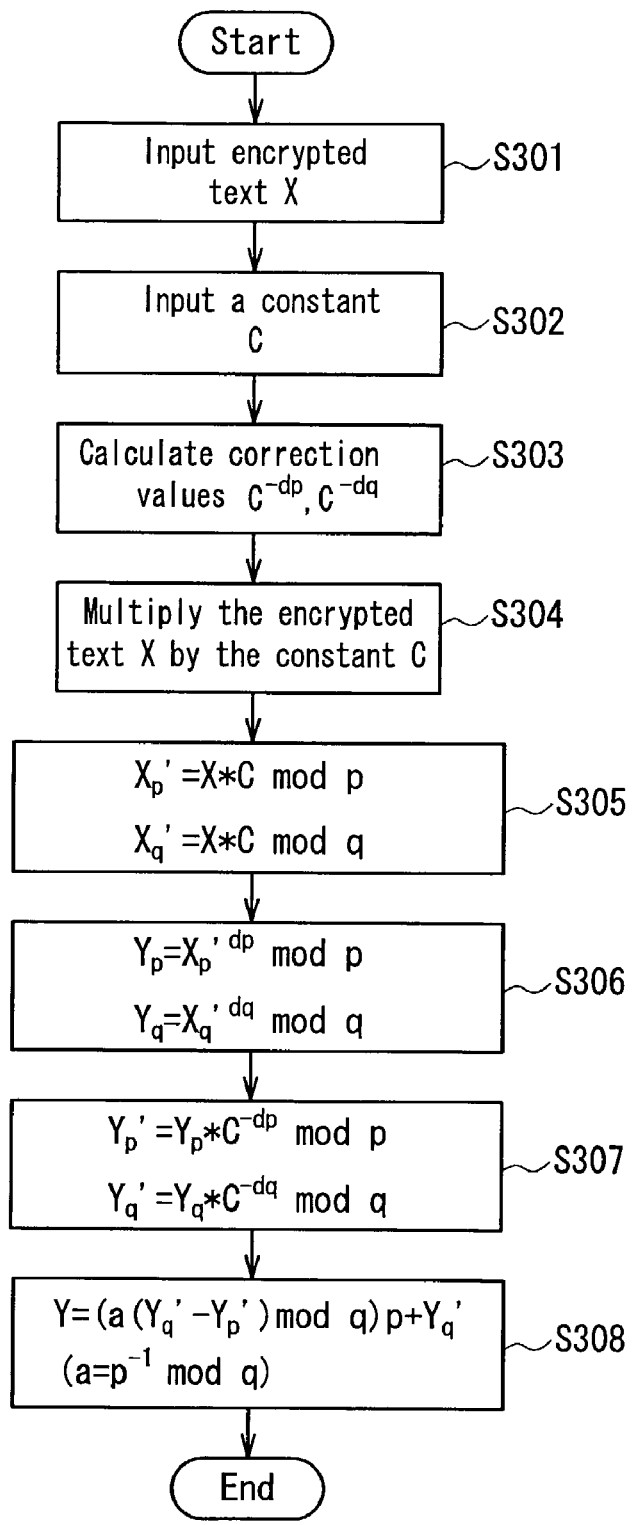
FIG. 3 is a flow chart illustrating processing in the encryption operating apparatus having side-channel attack resistance in Embodiment 1 according to the present invention.

Next, the processing flow of a program for realizing the encryption operating apparatus having side-channel attack resistance of Embodiment 1 according to the present invention will be described. FIG. 3 is a flow chart illustrating the processing of a program for realizing the encryption operating apparatus having side-channel attack resistance of Embodiment 1 according to the present invention.

In FIG. 3, ciphertext X is input (Operation 301). This also applies to the case where an attacker attempting to conduct timing attack or SPA inputs dummy ciphertext Xd for analyzing secret keys. A constant C for multiplying the input ciphertext X or dummy ciphertext Xd is also input (Operation 302). The constant C is assumed to have the relationships C>p and C>q with respect to secret keys p and q.

Furthermore, correction values $C^{-dp}$ and $C^{-dq}$ required for finally obtaining plaintext are calculated (Operation 303). Herein, since dp=d mod (p-1) and dq=d mod (q-1), and C represents a constant, the correction values $C^{-dp}$ and $C^{-dq}$ required for finally obtaining plaintext are also constant values.

First, the ciphertext X or the dummy ciphertext Xd is multiplied by the input constant C (Operation 304). Then, remainder operations are conducted using the secret keys p and q as represented by Expression 36 (Operation 305).

$$X_p' = X*C \bmod p$$
$$X_q' = X*C \bmod q \quad (36)$$

In Embodiment 1, X*C>p and X*C>q always hold from the relationships C>p and C>q. Therefore, even in the case where any ciphertext X or dummy ciphertext Xd is input, the remainder operations are conducted.

Next, a modular exponentiation operation based on a Chinese remainder theorem as represented by Expression 37 is conducted with respect to the results of the above remainder operations (Operation 306). Correction operations as represented by Expression 38 are conducted using the previously calculated correction values $C^{-dp}$ and $C^{-dq}$ (Operation 307).

$$Y_p = X_p'^{dp} \bmod p$$
$$Y_q = X_q'^{dq} \bmod q \quad (37)$$
$$Y_p' = Y_p * C^{-dp} \bmod p$$
$$Y_q' = Y_q * C^{-dq} \bmod q \quad (38)$$

Finally, the plaintext Y before being encrypted is calculated by Expression 39, based on the correction operation values $Y_p'$ and $Y_q'$ (Operation 308).

$$Y = (a(Y_q' - Y_p') \bmod q)p + Y_p' \quad (39)$$

where $a = p^{-1} \bmod q$

Thus, remainder operations and modular exponentiation operations are conducted with respect to the operation results obtained by multiplying the input ciphertext X by the constant C (where C>p and C>q), and thereafter, correction is made, whereby remainder operations are always conducted even in the case where any input is made. Therefore, the relationship in magnitude between the input value and the secret keys p and q cannot be obtained based on the difference in operation processing time and the difference in waveform of a power consumption. Accordingly, an operating apparatus strong to side-channel attack such as timing attack and SPA can be provided.

Furthermore, since C represents a constant, correction values are also constants. Unlike the case using a random number, it is not required to calculate correction values every time a value to be multiplied is varied. Therefore, operation processing can be conducted at a high speed without complicating operation processing of decoding.

Since the relationships C>p and C>q only need to be satisfied, constants $C_p$ and $C_q$ satisfying the relationships $C_p$>p and $C_q$>q may be determined with respect to p and q. More specifically, since the input X is always multiplied by the constant $C_p$ larger than the secret key p and the constant $C_q$ larger than the secret key q, X*$C_p$ always takes a value larger than p, and X*$C_q$ always takes a value larger than q. Thus, a remainder operation using a remainder value p or q is always conducted, so that the input value X cannot be compared with the remainder value p or q in terms of magnitude, irrespective of whether timing attack is used or SPA is used.

On the other hand, since $C_p$ and $C_q$ are constants, correction values $C_p^{-dp}$ and $C_q^{-dq}$ only need to be calculated once. Therefore, it is not required to derive correction values every time a remainder operation is conducted, which can reduce an operation processing overhead as a whole.

Because of the above, operation processing can be conducted at a high speed without increasing an operation processing overhead while effectively preventing side-channel attack such as timing attack and SPA.

The configuration of an encryption operating apparatus having side-channel attack resistance in this case is the same as that shown in FIG. 2. More specifically, in FIG. 2, the constants $C_p$ and $C_q$ having the relationships $C_p$>p and $C_q$>q with respect to the secret keys p and q are input from the constant input part 2. The input constants $C_p$ and $C_q$ are stored in the constant storing part 3.

The configuration without the constant input part 2 is also considered. That is, the constants $C_p$ and $C_q$ having the relationships $C_p$>p and $C_q$>q with respect to the secret keys p and q are previously stored in the constant storing part 3 during mounting so that a user is not required to input the constants $C_p$ and $C_q$. It is also considered that the constants $C_p$ and $C_q$ are previously determined during mounting.

Furthermore, in the correction value calculating part 4, the correction values $C_p^{-dp}$ and $C_qC^{-dq}$ required for finally obtaining plaintext are obtained. Herein, dp=d mod (p−1) and dq=d mod (q−1), and $C_p$ and $C_q$ are constants. Therefore, the correction values $C_p^{-dp}$ and $C_q^{-dq}$ required for finally obtaining plaintext are also constant values. The calculated correction values $C_p^{-dp}$ and $C_q^{-dq}$ are stored in the correction value storing part 5.

The configuration without the correction value operating part 4 is also considered in the same way as in the constant input part 2. That is, the correction values $C_p^{-dp}$ and $C_q^{-dq}$ are previously calculated based on the constants $C_p$ and $C_q$ stored in the constant storing part 3 and stored in the correction value storing part 5. Because of this, it can be expected that an operation processing overhead is reduced.

In the constant multiplying part 6, the ciphertext X or the dummy ciphertext Xd input from the ciphertext input part 1 is multiplied by the constants $C_p$ and $C_q$ stored in the constant storing part 3. Multiplication with respect to the ciphertext X is as represented by Expression 40. Results $X_p$ and $X_q$ obtained by multiplications of Expression 40 are stored in the multiplication result storing part 7.

$$X_p = X * C_p$$

$$X_q = X * C_q \qquad (40)$$

Next, in the remainder operating part 8, a remainder operation using the secret keys p and q as remainder values as represented by Expression 41 is conducted with respect to the multiplication results stored in the multiplication result storing part 7. Herein, $X*C_p > p$ and $X*C_q > q$ always hold from the relationships $C_p > p$ and $C_q > q$. Thus, in the remainder operating part 8, even in the case where any input is made in the ciphertext inputting part 1, remainder operations are conducted. Results $X_p'$ and $X_q'$ of the remainder operations calculated by Expression 41 are stored in the remainder operation result storing part 9.

$$X_p' = X_p \bmod p$$

$$X_q' = X_q \bmod q \qquad (41)$$

Then, in the Chinese remainder RSA processing part 10, a modular exponentiation operation based on a Chinese remainder theorem as represented by Expression 42 is conducted with respect to the results of a remainder operation stored in the remainder operation result storing part 9. Operation results $Y_p$ and $Y_q$ of modular exponentiation operations as represented by Expression 42 are stored in the modular exponentiation operation result storing part 11.

$$Y_P = X_p'^{dp} \bmod p \qquad (42)$$
$$= (X^{dp} * C^{dp}) \bmod p$$
$$Y_q = X_q'^{dq} \bmod q$$
$$= (X^{dq} * C_q^{dq}) \bmod q$$

In the correction processing part 12, the input values X or Xd are corrected to operation results in the case where a modular exponentiation operation is conducted by using the previously calculated correction values $C_p^{-dp}$ and $C_q^{-dq}$ stored in the correction value storing part 5 in accordance with Expression 43. $C_p$ and $C_q$ are constants, so that the correction values $C_p^{-dp}$ and $C_q^{-dq}$ are also constants. The operation processing for obtaining correction values $C^{-dp}$ and $C^{-dq}$ need to be conducted only once. The correction operation values $Y_p'$ and $Y_q'$ are stored in the correction result storing part 13.

$$Y_p' = Y_p * C^{-dp} \bmod p \qquad (43)$$
$$= X^{dp} \bmod p$$
$$Y_q' = Y_q * C^{-dq} \bmod q$$
$$= X^{dq} \bmod q$$

Finally, in the plaintext outputting part 14, plaintext Y before being encrypted is calculated as represented by Expression 44, based on the correction operation values $Y_p'$ and $Y_q'$ corrected in the correction processing part 12 and stored in the correction result storing part 13.

$$Y = (a(Y_q' - Y_p') \bmod q) p + Y_p' \qquad (44)$$

where $a = p^{-1} \bmod q$

Because of the above configuration, an authorized user who knows the secret keys p and q can obtain the plaintext Y with an operation processing overhead comparable to the ordinary operation processing overhead, in the same way as in multiplication of the constant C. On the other hand, an attacker attempting to analyze without authorization cannot obtain the secret keys by side-channel attack.

Figure 4:
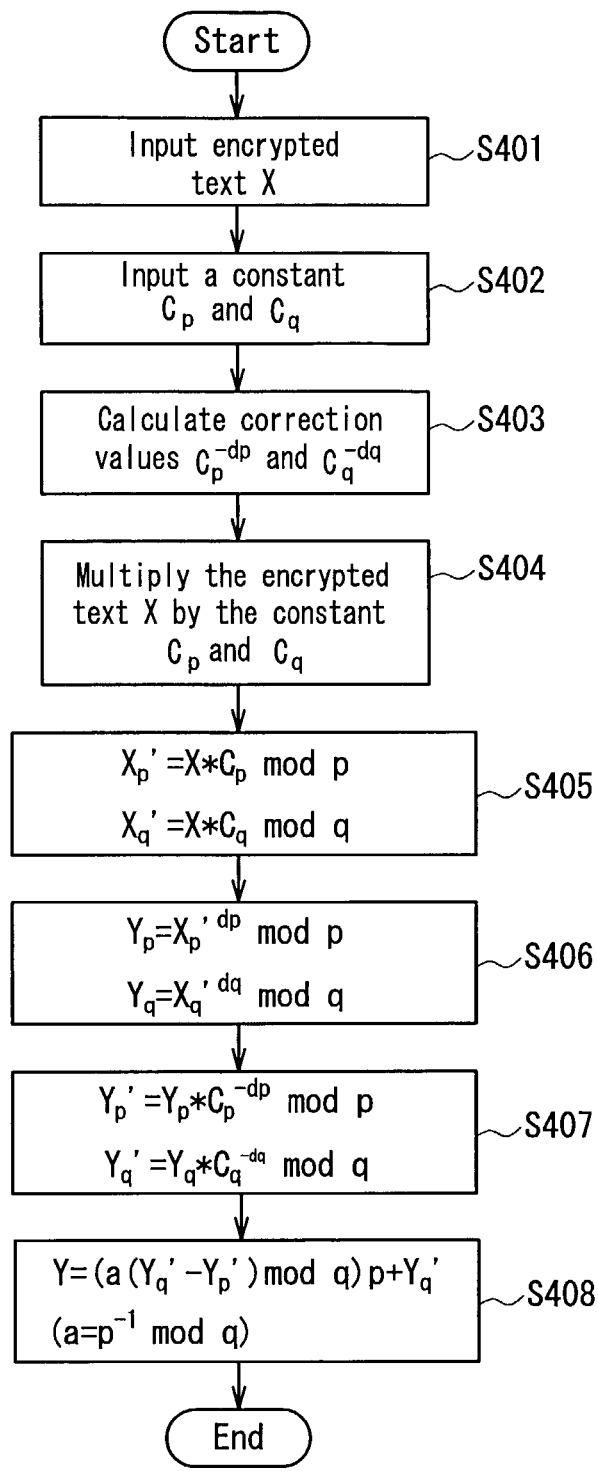
FIG. 4 is a flow chart illustrating processing in the encryption operating apparatus having side-channel attack resistance in Embodiment 1 according to the present invention.

Next, the processing flow of a program for realizing the encryption operating apparatus having side-channel attack resistance in the above-mentioned case will be described. FIG. 4 is a flow chart illustrating the processing of a program for realizing the encryption operating apparatus having side-channel attack resistance of Embodiment 1 using the constants $C_p$ and $C_q$.

In FIG. 4, first, ciphertext X is input (Operation 401). This also applies to the case where an attacker attempting to conduct timing attack or SPA inputs dummy ciphertext Xd for analyzing secret keys. Constants $C_p$ and $C_q$ for multiplying the input ciphertext X or dummy ciphertext Xd are input (Operation 402). The constants $C_p$ and $C_q$ are assumed to have relationships $C_p > p$ and $C_q > q$ with respect to the secret keys p and q.

Furthermore, correction values $C_p^{-dp}$ and $C_q^{-dq}$ required for finally obtaining plaintext are calculated (Operation 403). Herein, dp=d mod (p−1) and dq=d mod (q−1), and $C_p$ and $C_q$ are constants, so that the correction values $C_p^{-dp}$ and $C_q^{-dq}$ required for finally obtaining plaintext are also constant values.

First, the ciphertext X or the dummy ciphertext Xd is multiplied by the input constants $C_p$ and $C_q$ (Operation 404). Then, remainder operations using the secret keys p and q as remainder values, as represented by Expression 45, are conducted with respect to the multiplication results.

$$X_p' = X * C_p \bmod p$$

$$X_q' = X * C_q \bmod q \qquad (45)$$

In the present example, $X*C_p > p$ and $X*C_q > q$ always hold from the relationships $C_p > p$ and $C_q > q$. Therefore, even in the case where any ciphertext X or dummy ciphertext Xd is input, the above remainder operations are conducted.

Next, modular exponentiation operations based on a Chinese remainder theorem as represented by Expression 46 are conducted with respect to the results of the above remainder operations (Operation 406). Correction operations as represented by Expression 47 are conducted using the previously calculated correction values $C_p^{-dp}$ and $C_q^{-dq}$ (Operation 407).

$$Y_p = X_p'^{dp} \bmod p$$

$$Y_q = X_q'^{dq} \bmod q \tag{46}$$

$$Y_p' = Y_p * C_p^{-dp} \bmod p$$

$$Y_q' = Y_q * C_q^{-dq} \bmod q \tag{47}$$

Finally, plaintext before being encrypted is calculated based on the correction operation values $Y_p'$ and $Y_q'$ in accordance with Expression 48 (Operation 408).

$$Y = (a(Y_q' - Y_p') \bmod q)p + Y_p' \tag{48}$$

where $a = p^{-1} \bmod q$

Thus, remainder operations and modular exponentiation operations are conducted with respect to the operation results obtained by multiplying the input ciphertext X by the constants $C_p$ and $C_q$ (where $C_p > p$ and $C_q > q$), and thereafter, correction is made, whereby remainder operations are always conducted even in the case where any input is made. Therefore, the relationship in magnitude between the input value and the secret keys p and q cannot be obtained based on the difference in operation processing time and the difference in waveform of a power consumption. Accordingly, an operating apparatus strong to side-channel attack such as timing attack and SPA can be provided.

Furthermore, since $C_p$ and $C_q$ represent constants, correction values are also constants. Unlike the case using a random number, it is not required to calculate correction values every time a value to be multiplied is varied. Therefore, operation processing can be conducted at a high speed without complicating operation processing of decoding.

Hitherto, in Embodiment 1, the case where N is represented by multiplication of two numbers which are relatively prime numbers (i.e., N=p*q) has been described. However, the Chinese remainder theorem also holds even in the case where N is represented by multiplication of a plurality of numbers which are relatively prime numbers as represented by Expression 49.

$$N = p(0)\alpha^{(0)} * p(1)\alpha^{(1)} * \ldots * p(n)\alpha^{(n)} \tag{49}$$

where $n \geq 2$ or $\alpha(0) \geq 2$

Thus, the relationships similar to the above-mentioned operations hold even by extending the Chinese remainder theorem to a plurality of numbers which are relatively prime numbers, and an operating apparatus strong to side-channel attack such as timing attack and SPA can be provided.

Furthermore, in the case where a modular exponentiation operation is conducted based on the Chinese remainder theorem as represented by Expression 33, a binary method for calculation based on the value of each bit of an exponent and a window method for conducting processing by preparing a previous calculation table of a K-bit are well-known. In Embodiment 1, either calculation method is applicable.

The operating apparatus and method of Embodiment 1 are applicable to all the systems for conducting a modular exponentiation operation, using secret information such as EPOC and e-sign for a remainder, as well as ciphertext of a RSA system, and the effects obtained therefrom are the same.

As described above, in Embodiment 1, by loading the above-mentioned program onto a computer for execution, even in the case where any input is made, a remainder operation is always conducted. Therefore, the relationship in magnitude between the input value and the secret key p or q based on the difference in operation processing time and wavelength of a power consumption cannot be derived, and a decoding operating method having high security with respect to side-channel attack can be provided.

Furthermore, a correction value is calculated based on a constant. Therefore, the first one operation is enough for obtaining a correction value, and hence, it can be expected that an operation processing overhead is further reduced as a whole.

Embodiment 2

An encryption operating apparatus having side-channel attack resistance of Embodiment 2 according to the present invention will be described with reference to the drawings. In Embodiment 2, Montgomery modular exponentiation operation is applied to a modular exponentiation operation, and a Montgomery parameter R is used in place of a constant C in Embodiment 1.

More specifically, due to the precondition for conducting a Montgomery modular exponentiation operation, the Montgomery parameter R is always larger than any of secret keys p and q, so that X*R always takes a value larger than p or q. Thus, even in the case where any input X is made, a remainder operation using a remainder value p or q is always conducted. Even in the case where timing attack is used or SPA is used, the comparison between the input X and the remainder value p or q cannot be made.

On the other hand, unlike Embodiment 1, a correction operation is not required in Embodiment 2. That is, in Embodiment 2, a function MONT_EXP is determined as represented by Expression 50 as a modular exponentiation operation to be conducted after the remainder operation.

$$R > p$$

$$\text{MONT\_EXP}(X, d, R, p) = (X * R^{-1})^d \bmod p \tag{50}$$

In Expression 50, assuming that the input X is XR mod p, the exponent is d, and the remainder is the secret key p, a modular exponentiation operation value $X^d$ mod p can be obtained directly as represented by Expression 51.

$$\begin{aligned} & R > p \\ & \text{MONT\_EXP}(XR \bmod p, d, R, p) \\ & \quad = ((XR \bmod p)R^{-1}) \bmod p \\ & \quad = X^d \bmod P \end{aligned} \tag{51}$$

The same calculation can be conducted with respect to the other secret key q, so that a modular exponentiation operation value can be obtained directly without conducting a correction operation. This makes it unnecessary to derive a correction value and conduct a correction operation using the correction value, so that an operation processing overhead can be reduced as a whole.

Furthermore, in the case where a Montgomery modular exponentiation operation is conducted, a binary method for calculating a remainder based on the value of each bit of an exponent and a window method for calculating a remainder by preparing a previous calculation table of K-bit are well-known. In Embodiment 2, any of the calculation methods are applicable.

By using the above-mentioned operating method, operation processing can be conducted at a high speed without increasing an operation processing overhead while effectively preventing side-channel attack such as timing attack and SPA. Representative examples of the Montgomery parameter R include $2^{512}$, $2^{1024}$ or the like.

Figure 5:
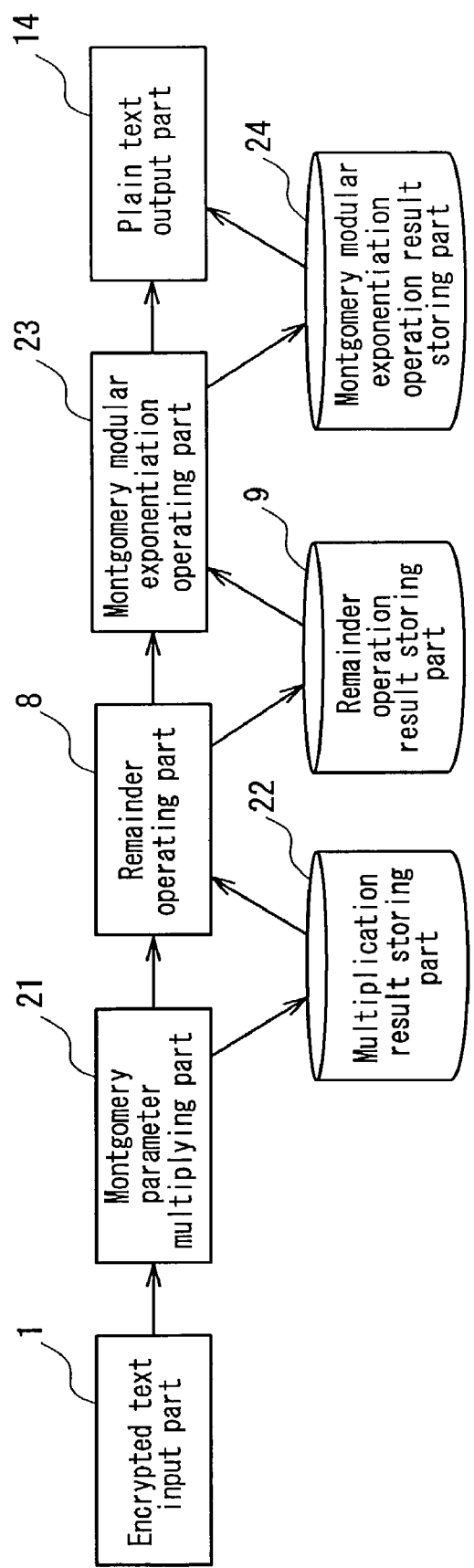
FIG. 5 shows a configuration of the encryption operating apparatus having side-channel attack resistance in Embodiment 2 according to the present invention.

FIG. 5 shows a specific configuration. FIG. 5 is a view showing a configuration of an encryption operating apparatus having side-channel attack resistance of Embodiment 2 according to the present invention. In Embodiment 2, the case where decoding processing in RSA processing with Chinese remainder theorem is conducted will be described.

In FIG. 5, reference numeral 1 denotes a ciphertext input part in the same way as in Embodiment 1, which is used for inputting ciphertext X for decoding. A third party conducting timing attack or SPA also inputs dummy ciphertext Xd for analyzing secret keys through the ciphertext input part 1. The input ciphertext X or Xd is given to a Montgomery parameter multiplying part 21.

Next, reference numeral 21 denotes a Montgomery parameter multiplying part for multiplying the ciphertext X or the dummy ciphertext Xd input from the ciphertext input part 1 by the Montgomery parameter R. Due to the precondition of the Montgomery modular exponentiation operation, the Montgomery parameter R has relationships R>p and R>q with respect to secret keys p and q. Therefore, in Embodiment 2, X*R>p and X*R>q always hold in the same way as in Embodiment 1. Multiplication with respect to the ciphertext X is as represented by Expression 52. A result X' obtained by multiplication of Expression 52 is stored in a multiplication result storing part 22.

$$X'=X*R \qquad (52)$$

Reference numeral 8 denotes a remainder operating part for respectively conducting remainder operations using the secret keys p and q as remainder values with respect to the multiplication result stored in the multiplication result storing part 22. As described above, in Embodiment 2, X*R>p and X*R>q always hold from the relationships R>p and R>q. Thus, in the remainder operating part 8, even in the case where any input is made in the ciphertext input part 1, remainder operations are conducted.

The remainder operations in Embodiment 2 can be expressed by Expression 53. Results $X_p'$ and $X_q'$ of the remainder operations calculated by Expression 53 are stored in a remainder operation result storing part 9.

$$X_p'=X' \bmod p$$

$$X_q'=X' \bmod q \qquad (53)$$

Furthermore, reference numeral 23 denotes a Montgomery modular exponentiation operating part for conducting Montgomery modular exponentiation operations represented by Expression 54 with respect to the results of the remainder operations stored in the remainder operation result storing part 9. Operation results $Y_p$ and $Y_q$ of the Montgomery modular exponentiation operations represented by Expression 54 are stored in a Montgomery modular exponentiation operation result storing part 24.

$$Y_p=\text{MONT\_EXP}(X_p',dp,R,p)$$

$$Y_q=\text{MONT\_EXP}(X_q',dq,R,q) \qquad (54)$$

where dp=d mod(p−1), dq=d mod(q−1)

A function MONT_EXP for conducting the Montgomery modular exponentiation operations is defined by Expression 55.

R>p $$\text{MONT\_EXP}(X,d,R,p)=(X*R^{-1})^d \bmod p \qquad (55)$$

$Y_p$ and $Y_q$ in Expression 54 become identical with the results obtained by conducting modular exponentiation operations directly, using Chinese remainder theorem, as represented by Expression 56, which makes it unnecessary to conduct a correction operation.

$$Y_p'=X_p'^{dp} \bmod p$$

$$Y_q'=X_q'^{dq} \bmod q \qquad (56)$$

Finally, reference numeral 14 denotes a plaintext output part for calculating plaintext Y before being encrypted as presented by Expression 57, based on the operation values $Y_p'$ and $Y_q'$ calculated in the Montgomery modular exponentiation operating part 23 and stored in the Montgomery modular exponentiation operation result storing part 24. In the case where an input value is the dummy ciphertext Xd, an erroneous calculated value is output. In side-channel attack, there is no problem in the calculated value.

$$Y=(a(Y_q'-Y_p') \bmod q)p+Y_p' \qquad (57)$$

where $a=p^{-1} \bmod q$

Because of the above configuration, an authorized user who knows the secret keys p and q can obtain plaintext Y with an operation processing overhead comparable to the ordinary operation processing overhead. On the other hand, an attacker who attempts to analyze without authorization cannot obtain the secret keys by side-channel attack.

Figure 6:
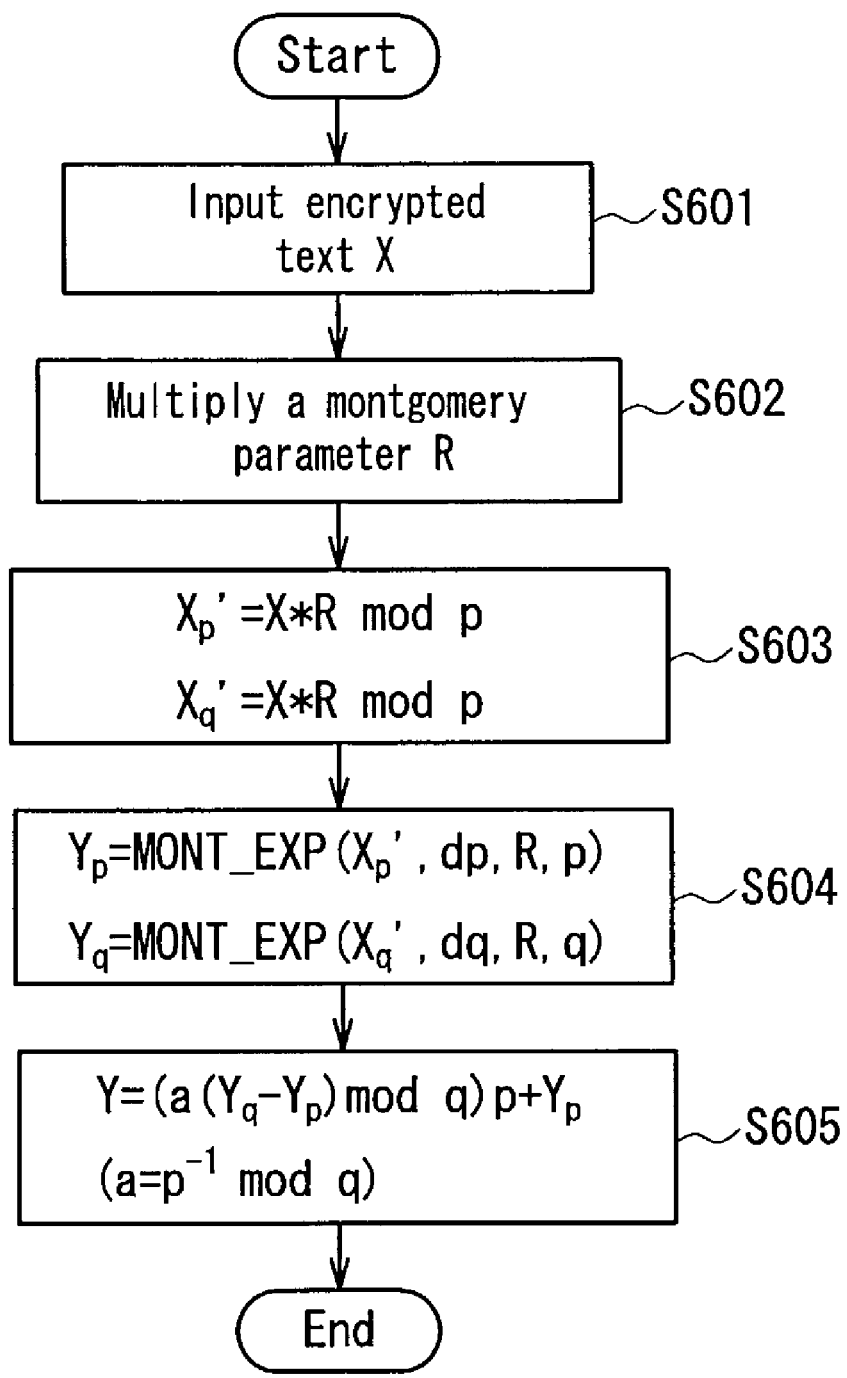
FIG. 6 is a flow chart illustrating processing in the encryption operating apparatus having side-channel attack resistance in Embodiment 2 according to the present invention.

Next, the processing flow of a program for realizing the encryption operating apparatus having side-channel attack resistance of Embodiment 2 according to the present invention will be described. FIG. 6 is a flow chart illustrating the processing of a program for realizing the encryption operating apparatus having side-channel attack resistance of Embodiment 2 according to the present invention.

In FIG. 6, ciphertext X is input (Operation 601) and is multiplied by a Montgomery parameter R (Operation 602). Due to the precondition of the Montgomery modular exponentiation operations, the Montgomery parameter R has relationships R>p and R>q with respect to the secret keys p and q. Thus, in Embodiment 2, X*R>p and X*R>q always hold in the same way as in Embodiment 1. The same processing is also conducted in the case where a third party conducting timing attack or SPA inputs the dummy ciphertext Xd for analyzing the secret keys.

Next, remainder operations using the secret keys p and q as remainder values are respectively conducted as presented by Expression 58 with respect to the multiplication results of the ciphertext X and the Montgomery parameter R (Operation 603). In Embodiment 2, X*R>p and X*R>q always hold, so that even in the case where any ciphertext X is input, remainder operations are conducted.

$$X_p'=X*R \bmod p$$

$$X_q'=X*R \bmod q \qquad (58)$$

Then, Montgomery modular exponentiation operations represented by Expression 59 are conducted using the operation results of the remainder operations (Operation 604). A function MONT_EXP used for the Montgomery modular exponentiation operations are defined by Expression 60.

$$Y_p=\text{MONT\_EXP}(X_p',dp,R,p)$$

$$Y_q=\text{MONT\_EXP}(X_q',dq,R,q) \qquad (59)$$

where dp=d mod(p−1), dq=d mod(q−1)

R>p $$\text{MONT\_EXP}(X,d,R,p)=(X*R^{-1})^d \bmod p \qquad (60)$$

$Y_p$ and $Y_q$ in Expression 59 become identical with the results obtained by conducting modular exponentiation operations directly, using Chinese remainder theorem, as represented by Expression 61, which makes it unnecessary to conduct a correction operation.

$$Y_p = X_p'^{dp} \bmod p$$

$$Y_q = X_q'^{dq} \bmod q \qquad (61)$$

Finally, plaintext Y before being encrypted is calculated as presented by Expression 62, based on the operation values $Y_p$ and $Y_q$ calculated by the Montgomery modular exponentiation operations (Operation 605).

$$Y = (a(Y_q - Y_p) \bmod q) p + Y_p \qquad (62)$$

where $a = p^{-1} \bmod q$

Because of the above processing, an authorized user who knows the secret keys p and q can obtain plaintext Y with an operation processing overhead comparable to the ordinary operation processing overhead. On the other hand, an attacker who attempts to analyze without authorization cannot obtain the secret keys by side-channel attack.

Furthermore, since the relationships R>p and R>q only need to be satisfied, Montgomery parameters $R_p$ and $R_q$ satisfying the relationships $R_p$>p and $R_q$>q may be used with respect to p and q. More specifically, since the input X is always multiplied by the Montgomery parameter $R_p$ larger than the secret key p and the Montgomery parameter $R_q$ larger than the secret key q, $X*R_p$ always takes a value larger than p, and $X*R_q$ always takes a value larger than q. Thus, a remainder operation using a remainder value p or q is always conducted, so that the input value X cannot be compared with the remainder value p or q in terms of magnitude, irrespective of whether timing attack is used or SPA is used.

The configuration of the encryption operating apparatus having side-channel attack resistance in this case is the same as that shown in FIG. 5. In FIG. 5, in the Montgomery parameter multiplying part 21, the ciphertext X or the dummy ciphertext Xd input from the ciphertext input part 1 is multiplied by the Montgomery parameter $R_p$ or $R_q$. Due to the precondition of the Montgomery modular exponentiation operations, the Montgomery parameter R has relationships $R_p$>p and $R_q$>q with respect to secret keys p and q. Therefore, in Embodiment 2, $X*R_p$>p and $X*R_q$>q always hold in the same way as in Embodiment 1. Multiplication with respect to the ciphertext X is as represented by Expression 63. Results $X_p$ and $X_q$ obtained by multiplication of Expression 63 is stored in a multiplication result storing part 22.

$$X_p = X*R_p$$

$$X_q = X*R_q \qquad (63)$$

In the remainder operating part 8, remainder operations using the secret keys p and q as remainder values are conducted with respect to the multiplication results stored in the multiplication result storing part 22. As described above, in Embodiment 2, $X*R_p$>p and $X*R_q$>q always hold from the relationships $R_p$>p and $R_q$>q. Thus, in the remainder operating part 8, even in the case where any input is made in the ciphertext input part 1, remainder operations are conducted.

The remainder operations in Embodiment 2 can be expressed by Expression 64. Results $X_p'$ and $X_q'$ of the remainder operations calculated by Expression 64 are stored in the remainder operation result storing part 9.

$$X_p' = X_p \bmod p$$

$$X_q' = X_q \bmod q \qquad (64)$$

In the Montgomery modular exponentiation operating part 23, Montgomery modular exponentiation operations represented by Expression 65 are conducted with respect to the results of the remainder operations stored in the remainder operation result storing part 9. Operation results $Y_p$ and $Y_q$ of the Montgomery modular exponentiation operations represented by Expression 65 are stored in the Montgomery modular exponentiation operation result storing part 24.

$$Y_p = \text{MONT\_EXP}(X_p', dp, R_p, p)$$

$$Y_q = \text{MONT\_EXP}(X_q', dq, R_q, q) \qquad (65)$$

where $dp = d \bmod(p-1)$, $dq = d \bmod(q-1)$

A function MONT_EXP for conducting the Montgomery modular exponentiation operations is defined by Expression 66.

$$R > p$$

$$\text{MONT\_EXP}(X, d, R, p) = (X*R^{-1})^d \bmod p \qquad (66)$$

$Y_p$ and $Y_q$ in Expression 65 become identical with the results obtained by conducting modular exponentiation operations directly, using Chinese remainder theorem, as represented by Expression 67, which makes it unnecessary to conduct a correction operation.

$$Y_p' = X_p'^{dp} \bmod p$$

$$Y_q' = X_q'^{dq} \bmod q \qquad (67)$$

Finally, in the plaintext output part 14, plaintext Y before being encrypted as presented by Expression 68 is calculated, based on the operation values $Y_p'$ and $Y_q'$ calculated in the Montgomery modular exponentiation operating part 23 and stored in the Montgomery modular exponentiation operation result storing part 24.

$$Y = (a(Y_q' - Y_p') \bmod q) p + Y_p' \qquad (68)$$

where $a = p^{-1} \bmod q$

Because of the above configuration, an authorized user who knows the secret keys p and q can obtain plaintext Y with an operation processing overhead comparable to the ordinary operation processing overhead. On the other hand, an attacker who attempts to analyze without authorization cannot obtain the secret keys by side-channel attack.

Figure 7:
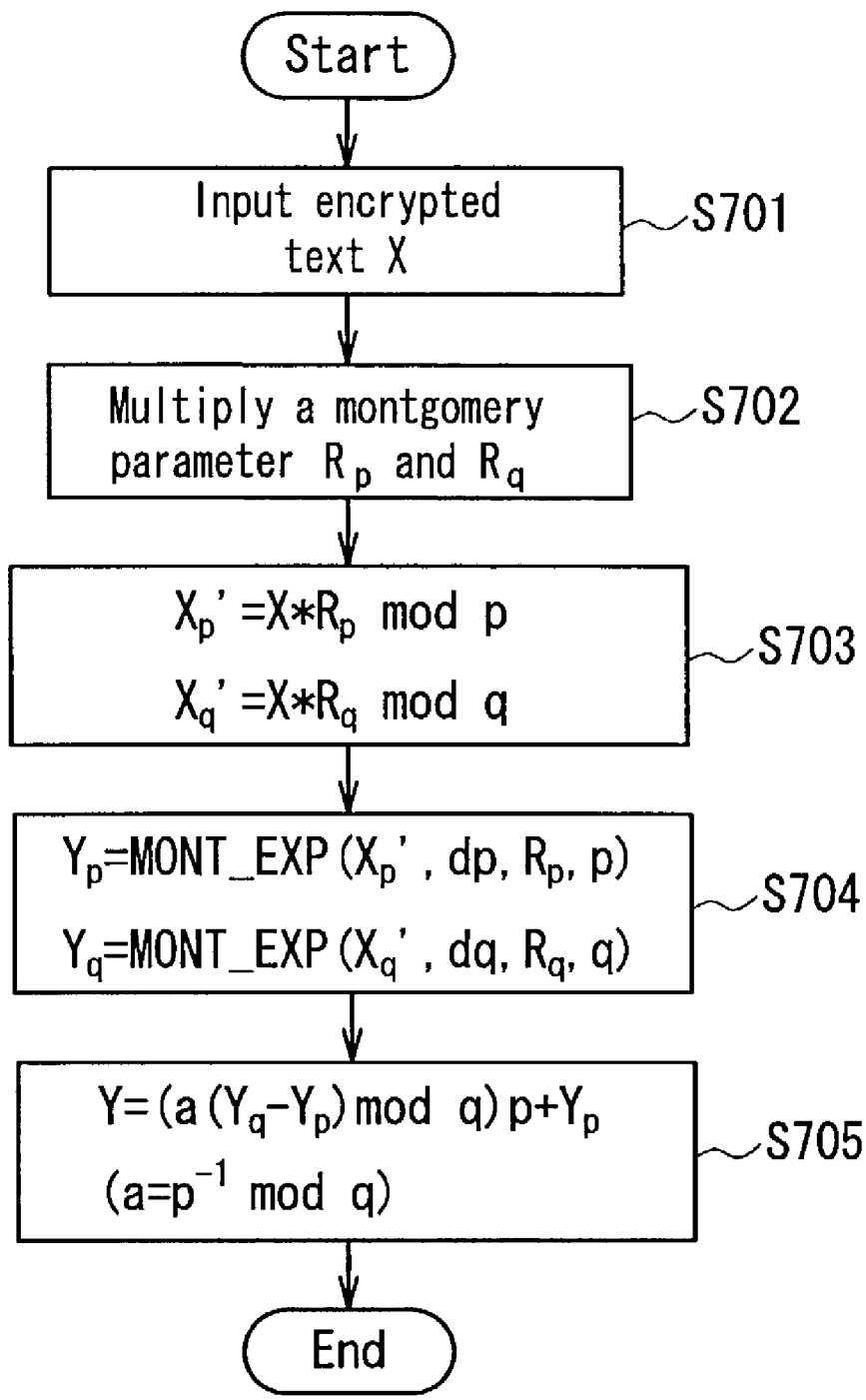
FIG. 7 is a flow chart illustrating processing in the encryption operating apparatus having side-channel attack resistance in Embodiment 2 according to the present invention.

Next, the processing flow of a program for realizing the encryption operating apparatus having side-channel attack resistance of Embodiment 2 using the Montgomery parameters $R_p$ and $R_q$ will be described. FIG. 7 is a flow chart illustrating the processing of a program for realizing the encryption operating apparatus having side-channel attack resistance of the present example.

In FIG. 7, ciphertext X is input (Operation 701) and is multiplied by a Montgomery parameter $R_p$ or $R_q$ (Operation 702). Due to the precondition of the Montgomery modular exponentiation operations, the Montgomery parameters $R_p$ and $R_q$ have relationships $R_p$>p and $R_q$>q with respect to the secret keys p and q. Thus, in the present example, $X*R_p$>p and $X*R_q$>q always hold. The same processing is also conducted in the case where a third party conducting timing attack or SPA inputs the dummy ciphertext Xd for analyzing the secret keys.

Next, remainder operations using the secret keys p and q as remainder values are respectively conducted as presented by Expression 69 with respect to the multiplication results of the ciphertext X and the Montgomery parameter R (Operation 703). In Embodiment 2, $X*R_p>p$ and $X*R_q>q$ always hold, so that even in the case where any ciphertext X is input, remainder operations are conducted.

$$X_p'=X*R_p \bmod p$$

$$X_q'=X*R_q \bmod q \quad (69)$$

Then, Montgomery modular exponentiation operations represented by Expression 70 are conducted using the operation results of the remainder operations (Operation 704). A function MONT_EXP used for the Montgomery modular exponentiation operations are defined by Expression 71.

$$Y_p=\text{MONT\_EXP}(X_p',dp,R_p,p)$$

$$Y_q=\text{MONT\_EXP}(X_q',dq,R_q,q) \quad (70)$$

where dp=d mod(p−1), dq=d mod(q−1)

R>p $$\text{MONT\_EXP}(X,d,R,p)=(X*R^{-1})^d \bmod p \quad (71)$$

$Y_p$ and $Y_q$ in Expression 70 become identical with the results obtained by conducting modular exponentiation operations directly, using Chinese remainder theorem, as represented by Expression 72, which makes it unnecessary to conduct a correction operation.

$$Y_p=X_p'^{dp} \bmod p$$

$$Y_q=X_q'^{dq} \bmod q \quad (72)$$

Finally, plaintext Y before being encrypted is calculated as presented by Expression 73, based on the operation values $Y_p$ and $Y_q$ calculated by the Montgomery modular exponentiation operations (Operation 705).

$$Y=(a(Y_q-Y_p) \bmod q)p+Y_p \quad (73)$$

where $a=p^{-1} \bmod q$

Hitherto, in Embodiment 2, the case where N is represented by multiplication of two numbers which are relatively prime numbers (i.e., N=p*q) has been described. However, the Chinese remainder theorem also holds even in the case where N is represented by multiplication of a plurality of numbers which are relatively prime numbers as represented by Expression 74.

$$N=p(0)\alpha^{(0)}*p(1)\alpha^{(1)}* \ldots *p(n)\alpha^{(n)} \quad (74)$$

where $n \geq 2$ or $\alpha(0) \geq 2$

Thus, the relationships similar to the above-mentioned operations hold even by extending the Chinese remainder theorem to a plurality of numbers which are relatively prime numbers, and an operating apparatus strong to side-channel attack such as timing attack and SPA can be provided.

Furthermore, in the case where the Montgomery modular exponentiation operations as represented by Expression 70 are conducted, a binary method for calculation based on the value of each bit of an exponent and a window method for conducting processing by preparing a previous calculation table of a K-bit are well-known. In Embodiment 2, either calculation method is applicable.

The operating apparatus and method of Embodiment 2 are applicable to all the systems for conducting a modular exponentiation operation, using secret information such as EPOC and e-sign for a remainder, as well as ciphertext of a general RSA system, and the effects obtained therefrom are the same.

As described above, in Embodiment 2, even in the case where any input is made, a remainder operation is always conducted. Therefore, the relationship in magnitude between the input value and the secret key p or q based on the difference in operation processing time and wavelength of a power consumption cannot be derived, and a decoding operating method having high security with respect to side-channel attack can be provided.

Furthermore, it is not required to conduct a correction operation, so that it can be expected that an operation processing overhead is further reduced as a whole.

Embodiment 3

An encryption operating apparatus having side-channel attack resistance of Embodiment 3 according to the present invention will be described with reference to the drawings. In Embodiment 3, a Montgomery modular exponentiation operation is applied to a modular exponentiation operation, and remainder operation values $R_p'=R \bmod p$ and $R_q'=R \bmod q$ with respect to a remainder value p or q of a Montgomery parameter R are used in place of the constant C in Embodiment 1 and the Montgomery parameter R in Embodiment 2.

More specifically, due to the precondition for conducting a Montgomery modular exponentiation operation, the Montgomery parameter R is always larger than either secret key p or q. However, $R_p'$ or $R_q'$ does not always take a value larger than p or q. Therefore, whether or not the remainder operation using the remainder value p or q is conducted is determined based on the magnitude of $R_p'$ or $R_q'$.

Herein, $R_p'$ or $R_q'$ is a number unknown to an attacker. Therefore, the attacker cannot reveal the remainder value p or q. More specifically, irrespective of whether timing attack is used or SPA is used, the attacker cannot reveal the remainder value p or q.

On the other hand, in Embodiment 3, a correction operation can be made unnecessary in the same way as in Embodiment 2. More specifically, first in Embodiment 3, a function MONT_EXP is determined as represented by Expression 75 as a modular exponentiation operation to be conducted after the remainder operation.

R>p $$\text{MONT\_EXP}(X,d,R,p)=(X*R^{-1})^d \bmod p \quad (75)$$

In Expression 75, assuming that the input X is $(XR_p') \bmod p$, the exponent is d, and the remainder is the secret key p, a modular exponentiation operation value $X^d \bmod p$ can be obtained directly as represented by Expression 76.

$$\begin{aligned}
R &> p \\
\text{MONT\_EXP}((X*R_p') &\bmod p, dp, R, p) \\
&= (((X*R_p') \bmod p) R^{-1})^d \bmod p \\
&= (((X*(R \bmod p)) \bmod p) R^{-1})^d \bmod p \\
&= X^d \bmod p
\end{aligned} \quad (76)$$

The same calculation can be conducted with respect to the other secret key q, so that a modular exponentiation operation value can be obtained directly without conducting a correction operation. This makes it unnecessary to derive a correction value and conduct a correction operation using the correction value, so that an operation processing overhead can be reduced as a whole.

Furthermore, in the same way as in Embodiment 2, any of calculation methods of a binary method for calculating a remainder based on the value of each bit of an exponent and a window method for calculating a remainder by preparing a previous calculation table of K-bit are applicable.

By using the above-mentioned operating method, operation processing can be conducted at a high speed without increasing an operation processing overhead while effectively preventing side-channel attack such as timing attack and SPA. Representative examples of the Montgomery parameter R include $2^{512}$, $2^{1024}$ or the like.

Figure 8:
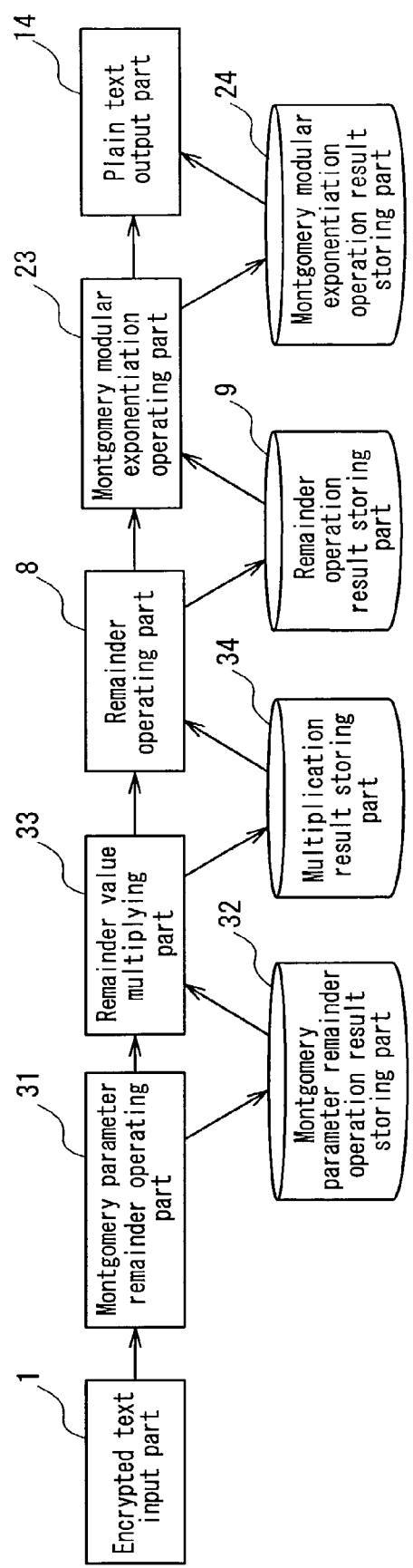
FIG. 8 shows a configuration of the encryption operating apparatus having side-channel attack resistance in Embodiment 3 according to the present invention.

FIG. 8 shows a specific configuration. FIG. 8 is a view showing a configuration of an encryption operating apparatus having side-channel attack resistance of Embodiment 3 according to the present invention. In Embodiment 3, the case where decoding processing in RSA with Chinese remainder theorem is conducted will be described.

In FIG. 8, reference numeral 1 denotes a ciphertext input part in the same way as in Embodiments 1 and 2, which is used for inputting ciphertext X for decoding. A third party conducting timing attack or SPA also inputs dummy ciphertext Xd for analyzing secret keys through the ciphertext input part 1. The input ciphertext X or Xd is given to a Montgomery parameter remainder operating part 31.

Next, reference numeral 31 denotes a Montgomery parameter remainder operating part for conducting a remainder operation to the remainder value p or q with respect to the Montgomery parameter R. Such a remainder operation is as represented by Expression 77. A result X' obtained by Expression 77 is stored in the Montgomery parameter remainder operation result storing part 32.

$$R_p'=R \bmod p$$

$$R_q'=R \bmod q \tag{77}$$

Next, reference numeral 33 denotes a remainder value multiplying part for multiplying the remainder operation values obtained in the Montgomery parameter remainder operating part 31 by the ciphertext X or the dummy ciphertext Xd input from the ciphertext input part 1. Multiplication with respect to the ciphertext X is as represented by Expression 78. Results $X_p'$ and $X_q'$ obtained by Expression 78 are stored in a multiplication result storing part 34.

$$X_p'=X*R_p'$$

$$X_q'=X*R_q' \tag{78}$$

Reference numeral 8 denotes a remainder operating part for respectively conducting remainder operations using the secret keys p and q as remainder values with respect to the multiplication results stored in the multiplication result storing part 34. As described above, in Embodiment 2, X*R>p and X*R>q always hold from the relationships R>p and R>q. However, this does not apply to Embodiment 3. It depends upon the magnitude of $R_p'$ or $R_q'$ whether or not a remainder operation is conducted.

The remainder operation in Embodiment 3 can be expressed by Expression 79. Results $X_p$ and $X_q$ of the remainder operations calculated by Expression 79 are stored in a remainder operation result storing part 9.

$$X_p=X_p' \bmod p$$

$$X_q=X_q' \bmod q \tag{79}$$

Furthermore, reference numeral 23 denotes a Montgomery operating part for conducting Montgomery operations represented by Expression 80 with respect to the results of the remainder operations stored in the remainder operation result storing part 9. Herein, Montgomery modular exponentiation operations as represented by Expression 80 are conducted. Operation results $Y_p$ and $Y_q$ of the Montgomery modular exponentiation operations represented by Expression 80 are stored in a Montgomery modular exponentiation operation result storing part 24.

$$Y_p=\text{MONT\_EXP}(X_p,dp,R,p)$$

$$Y_q=\text{MONT\_EXP}(X_q,dq,R,q) \tag{80}$$

where dp=d mod(p−1), dq=d mod(q−1)

$Y_p$ and $Y_q$ in Expression 80 become identical with the results obtained by conducting modular exponentiation operations directly, using Chinese remainder theorem, as represented by Expression 81, which makes it unnecessary to conduct a correction operation.

$$Y_p=X_p^{dp} \bmod p$$

$$Y_q=X_q^{dq} \bmod q \tag{81}$$

Finally, reference numeral 14 denotes a plaintext output part for calculating plaintext Y before being encrypted as presented by Expression 82, based on the operation values $Y_p$ and $Y_q$ calculated in the Montgomery modular exponentiation operating part 23 and stored in the Montgomery modular exponentiation operation result storing part 24. In the case where an input value is the dummy ciphertext Xd, an erroneous calculated value is output. In side-channel attack, there is no problem in the calculated value.

$$Y=(a(Y_q-Y_p) \bmod q)p+Y_p \tag{82}$$

where $a=p^{-1} \bmod q$

Because of the above configuration, an authorized user who knows the secret keys p and q can obtain plaintext Y with an operation processing overhead comparable to the ordinary operation processing overhead. On the other hand, an attacker who attempts to analyze without authorization cannot obtain the secret keys by side-channel attack.

Figure 9:
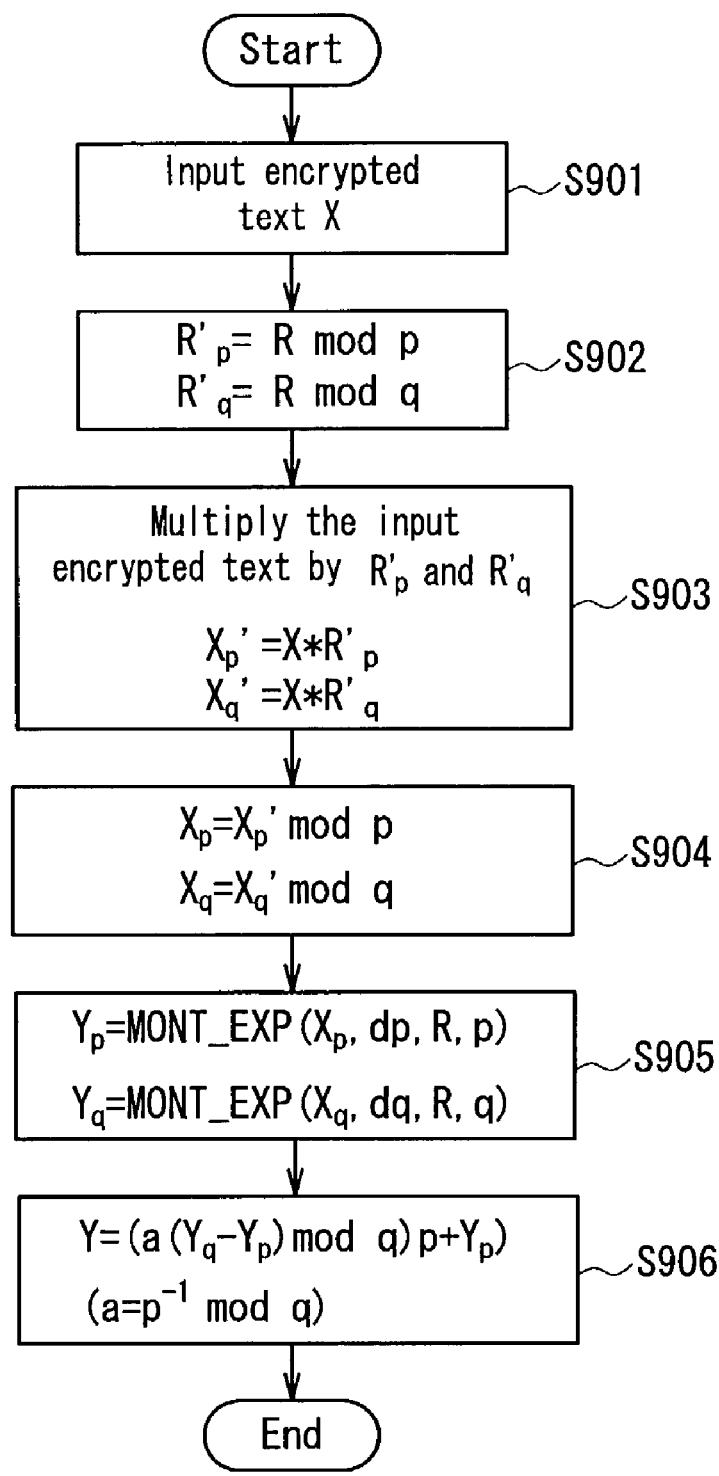
FIG. 9 is a flow chart illustrating processing in the encryption operating apparatus having side channel attack resistance in Embodiment 3 according to the present invention.

Next, the processing flow of a program for realizing the encryption operating apparatus having side-channel attack resistance of Embodiment 3 according to the present invention will be described. FIG. 9 is a flow chart illustrating the processing of a program for realizing the encryption operating apparatus having side-channel attack resistance of Embodiment 3 according to the present invention.

In FIG. 9, ciphertext X is input (Operation 901). This also applies to the case where a third party conducting timing attack or SPA inputs dummy ciphertext Xd for analyzing secret keys.

A remainder operation for a remainder value p or q is conducted with respect to a Montgomery parameter R (Operation 902), and the result of the remainder operation is multiplied by the input ciphertext X as represented by Expression 83.

$$X_p'=X*R \bmod p$$

$$X_q'=X*R \bmod q \tag{83}$$

Next, remainder operations using the secret keys p and q as remainder values are respectively conducted with respect to multiplication results $X_p'$ and $X_q'$ of the ciphertext X and the remainder operation values, as represented by Expression 84.

$$X_p=X_p' \bmod p$$

$$X_q=X_q' \bmod q \tag{84}$$

Using the operation results of the remainder operations, Montgomery modular exponentiation operations represented by Expression 85 are conducted (Operation 905). A function MONT_EXP used for the Montgomery modular exponentiation operations is defined by Expression 86.

$$Y_p = \text{MONT\_EXP}(X_p, dp, R, p)$$

$$Y_q = \text{MONT\_EXP}(X_q, dq, R, q) \tag{85}$$

where dp=d mod(p−1), dq=d mod(q−1)

R>p $$\text{MONT\_EXP}(X, d, R, p) = (X * R^{-1})^d \bmod p \tag{86}$$

$Y_p$ and $Y_q$ in Expression 85 become identical with the results obtained by conducting modular exponentiation operations directly, using Chinese remainder theorem, as represented by Expression 87, which makes it unnecessary to conduct a correction operation.

$$Y_p = X_p^{dp} \bmod p$$

$$Y_q = X_q^{dq} \bmod q \tag{87}$$

Finally, plaintext Y before being encrypted as presented by Expression 88 is calculated, based on the operation values $Y_p$ and $Y_q$ calculated by the Montgomery modular exponentiation operations (Operation 906).

$$Y = (a(Y_q - Y_p) \bmod q)p + Y_p \tag{88}$$

where $a = p^{-1} \bmod q$

Because of the above processing, an authorized user who knows the secret keys p and q can obtain plaintext Y with an operation processing overhead comparable to the ordinary operation processing overhead. On the other hand, an attacker who attempts to analyze without authorization cannot obtain the secret keys by side-channel attack.

Furthermore, in the same way as in Embodiment 2, Montgomery parameters $R_p$ and $R_q$ satisfying the relationships $R_p > p$ and $R_q > q$ may be used with respect to the secret keys p and q. In this case, the remainder value $R_p' = R_p \bmod p$ or $R_q' = R_q \bmod q$ does not always become larger than p or q. Therefore, whether or not the remainder operation using the remainder value p or q is conducted is determined based on the magnitude of $R_p'$ or $R_q'$.

Herein, $R_p'$ or $R_q'$ is a number unknown to an outside attacker. Therefore, the attacker cannot reveal the remainder value p or q. More specifically, irrespective of whether timing attack is used or SPA is used, the attacker cannot reveal the remainder value p or q.

On the other hand, in the present example, a correction operation can be made unnecessary in the same way as in the case using the Montgomery parameter R. More specifically, a function MONT_EXP is determined as represented by Expression 89 as a modular exponentiation operation to be conducted after the remainder operation.

$R_p > p$ $$\text{MONT\_EXP}(X, d, R_p, p) = (X * R_p^{-1})^d \bmod p \tag{89}$$

In Expression 89, assuming that the input X is $(X * R_p')^d$ mod p, the exponent is d, and the remainder is the secret key p, a modular exponentiation operation value $X^d$ mod p can be obtained directly as represented by Expression 90.

$$R_p > p \tag{90}$$

$$\text{MONT\_EXP}((X * R_p') \bmod p, dp, R_p, p)$$

$$= \left(((X * (R_p \bmod p)) R_p^{-1})^d \bmod p\right.$$

$$= X^d \bmod p$$

The same calculation can be conducted with respect to the other secret key q, so that a modular exponentiation operation value can be obtained directly without conducting a correction operation. This makes it unnecessary to derive a correction value and conduct a correction operation using the correction value, so that an operation processing overhead can be reduced as a whole.

Furthermore, in the same way as in Embodiment 2, any of calculation methods of a binary method for calculating a remainder based on the value of each bit of an exponent and a window method for calculating a remainder by preparing a previous calculation table of K-bit are applicable.

By using the above-mentioned operating method, operation processing can be conducted at a high speed without increasing an operation processing overhead while effectively preventing side-channel attack such as timing attack and SPA. Representative examples of the Montgomery parameter $R_p$ and $R_q$ include $2^{512}$, $2^{1024}$ or the like.

The configuration of the encryption operating apparatus having side-channel attack resistance in the above-mentioned case is the same as that shown in FIG. 8. More specifically, in the Montgomery parameter remainder operating part 31 shown in FIG. 8, a remainder operation to the remainder value p or q is conducted with respect to the Montgomery parameter $R_p$ or $R_q$, as represented by Expression 91. Results $R_p'$ and $R_q'$ obtained by Expression 91 are stored in the Montgomery parameter remainder operation result storing part 32.

$$R_p' = R_p \bmod p$$

$$R_q' = R_q \bmod q \tag{91}$$

Next, in the remainder value multiplying part 33, the remainder operation values obtained in the Montgomery parameter remainder operating part 31 are multiplied by the ciphertext X or the dummy ciphertext Xd input from the ciphertext input part 1, as represented by Expression 92. Results $X_p'$ and $X_q'$ obtained by Expression 92 are stored in the multiplication result storing part 34.

$$X_p' = X * R_p'$$

$$X_q' = X * R_q' \tag{92}$$

In the remainder operating part 8, remainder operations represented by Expression 93 using the secret keys p and q as remainder values are conducted with respect to the multiplication results stored in the multiplication result storing part 34. As described above, in Embodiment 3, it depends upon the magnitude of $R_p'$ or $R_p'$ whether or not a remainder operation is conducted. Results $X_p$ and $X_q$ of the remainder operations calculated by Expression 93 are stored in the remainder operation result storing part 9.

$$X_p = X_p' \bmod p$$

$$X_q = X_q' \bmod q \tag{93}$$

Next, in the Montgomery modular exponentiation operating part 23, Montgomery modular exponentiation operations represented by Expression 94 are conducted with respect to the results of the remainder operations stored in the remainder operation result storing part 9. Operation results $Y_p$ and $Y_q$ of the Montgomery modular exponentiation operations represented by Expression 94 are stored in a Montgomery modular exponentiation operation result storing part 24.

$$Y_p = \text{MONT\_EXP}(X_p, dp, R_p, p)$$

$$Y_q = \text{MONT\_EXP}(X_q, dq, R_q, q) \tag{94}$$

where dp=d mod(p−1), dq=d mod(q−1)

$Y_p$ and $Y_q$ in Expression 94 become identical with the results obtained by conducting modular exponentiation operations directly, using Chinese remainder theorem, as represented by Expression 95, which makes it unnecessary to conduct a correction operation.

$$Y_p = X_p{}^{dp} \bmod p$$

$$Y_q = X_q{}^{dq} \bmod q \tag{95}$$

Finally, in the plaintext output part 14, plaintext Y before being encrypted as presented by Expression 96 is calculated based on the operation values $Y_p$ and $Y_q$ calculated in the Montgomery modular exponentiation operating part 23 and stored in the Montgomery modular exponentiation operation result storing part 24.

$$Y = (a(Y_q - Y_p) \bmod q)p + Y_p \tag{96}$$

where $a = p^{-1} \bmod q$

Because of the above configuration, an authorized user who knows the secret keys p and q can obtain plaintext Y with an operation processing overhead comparable to the ordinary operation processing overhead even in the case where the Montgomery parameters are varied with respect to the secret keys p and q. On the other hand, an attacker who attempts to analyze without authorization cannot obtain the secret keys by side-channel attack.

Figure 10:
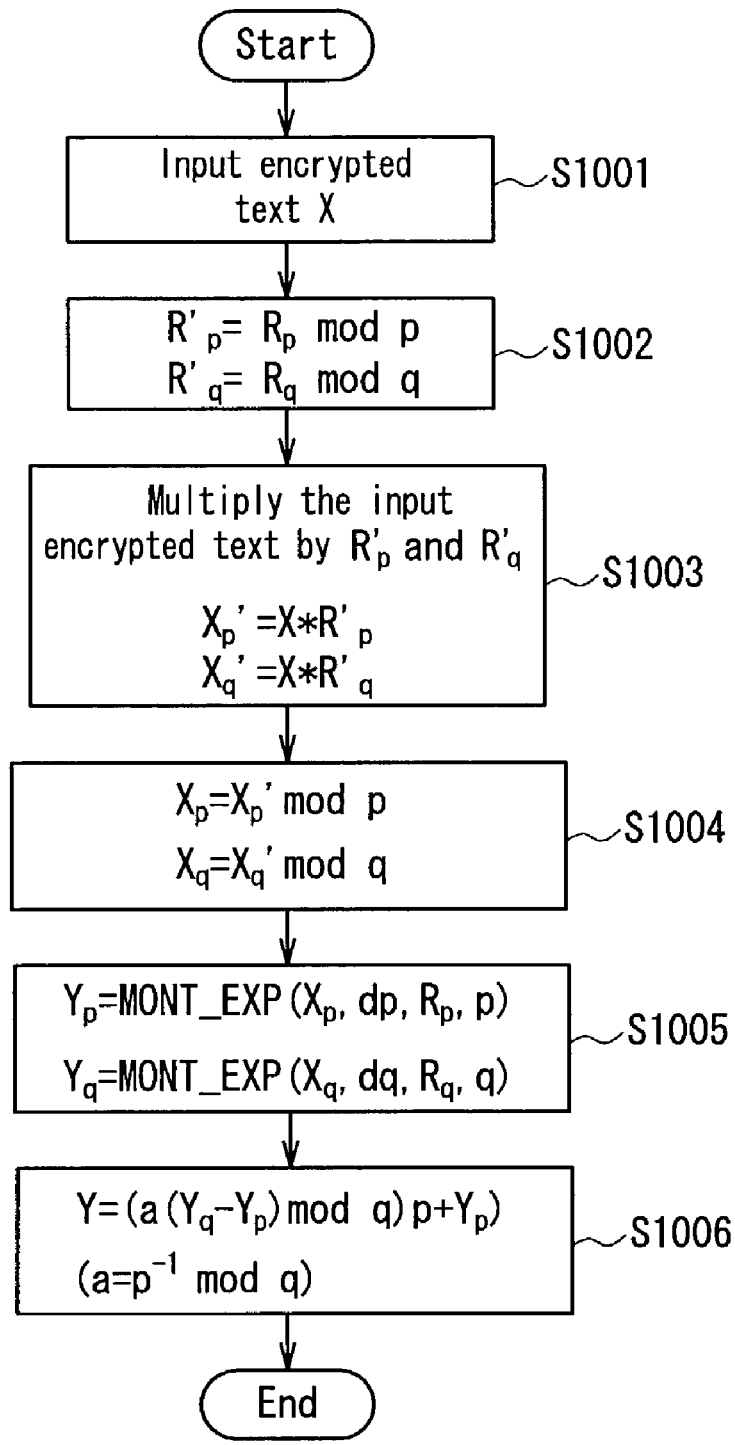
FIG. 10 is a flow chart illustrating processing in the encryption operating apparatus having side-channel attack resistance in Embodiment 3 according to the present invention.

Next, the processing flow of a program for realizing the encryption operating apparatus having side-channel attack resistance of the present example will be described. FIG. 10 is a flow chart illustrating the processing of a program for realizing the encryption operating apparatus having side-channel attack resistance of the present example.

In FIG. 10, ciphertext X is input (Operation 1001). This also applies to the case where a third party conducting timing attack or SPA inputs dummy ciphertext Xd for analyzing secret keys.

A remainder operation for a remainder value p or q is conducted with respect to a Montgomery parameter $R_p$ or $R_q$ (Operation 1002), and the result of the remainder operation is multiplied by the input ciphertext X as represented by Expression 97.

$$X_p' = X * R_p \bmod p$$

$$X_q' = X * R_q \bmod q \tag{97}$$

Next, remainder operations using the secret keys p and q as remainder values are respectively conducted with respect to multiplication results $X_p'$ and $X_q'$ of the ciphertext X and the remainder operation values, as represented by Expression 98.

$$X_p = X_p' \bmod p$$

$$X_q = X_q' \bmod q \tag{98}$$

Using the operation results of the remainder operations, Montgomery modular exponentiation operations represented by Expression 99 are conducted (Operation 1005). A function MONT_EXP used for the Montgomery modular exponentiation operations is defined by Expression 100.

$$Y_p = \text{MONT\_EXP}(X_p, dp, R_p, p)$$

$$Y_q = \text{MONT\_EXP}(X_q, dq, R_q, q) \tag{99}$$

where dp=d mod(p−1), dq=d mod(q−1)

$R_p > p$ $$\text{MONT\_EXP}(X, d, R_p, p) = (X * R_p{}^{-1})^d \bmod p \tag{100}$$

$Y_p$ and $Y_q$ in Expression 99 become identical with the results obtained by conducting modular exponentiation operations directly, using Chinese remainder theorem, as represented by Expression 101, which makes it unnecessary to conduct a correction operation.

$$Y_p = X_p{}^{dp} \bmod p$$

$$Y_q = X_q{}^{dq} \bmod q \tag{101}$$

Finally, plaintext Y before being encrypted as expressed by Expression 102 is calculated, based on the operation values $Y_p$ and $Y_q$ calculated by the Montgomery modular exponentiation operations (Operation 1006).

$$Y = (a(Y_q - Y_p) \bmod q)p + Y_p \tag{102}$$

where $a = p^{-1} \bmod q$

As described above, in Embodiment 3, whether or not the remainder operation is conducted is determined based on the magnitude of the product between the input value and the remainder operation value of the Montgomery parameter R. Therefore, the relationship in magnitude between the input value and the secret key p or q cannot be derived only based on the difference in operation processing time, waveform of power consumption, and the like. Thus, a decoding operating method having high security with respect to side-channel attack can be provided.

Furthermore, it is not required to conduct a correction operation, so that it can be expected that an operation processing overhead is further reduced as a whole.

Hitherto, in Embodiment 3, the case where N is represented by multiplication of two numbers which are relatively prime numbers (i.e., N=p*q) has been described. However, the Chinese remainder theorem also holds even in the case where N is represented by multiplication of a plurality of numbers which are relatively prime numbers as represented by Expression 103.

$$N = p(0)\alpha^{(0)} * p(1)\alpha^{(1)} * \ldots * p(n)\alpha^{(n)} \tag{103}$$

where $n \geq 2$ or $\alpha(0) \geq 2$

Thus, the relationships similar to the above-mentioned operations hold even by extending the Chinese remainder theorem to a plurality of numbers which are relatively prime numbers, and an operating apparatus strong to side-channel attack such as timing attack and SPA can be provided.

Furthermore, in the case where a Montgomery modular exponentiation operation as represented by Expression 80 is conducted, a binary method for calculation based on the value of each bit of an exponent and a window method for conducting processing by preparing a previous calculation table of a K-bit are well-known. In Embodiment 1, either calculation method is applicable.

The operating apparatus and method of Embodiment 3 are applicable to all the systems for conducting a modular exponentiation operation, using secret information such as EPOC and e-sign for a remainder, as well as ciphertext of a RSA system, and the effects obtained therefrom are the same.

Thus, in Embodiments 1, 2, and 3, the decoding processing has been described. In the processing of the present embodiment, the same effects can also be expected when an electronic signature is generated. More specifically, data targeted for generating an electronic signature is input in place of ciphertext X, and plaintext Y to be decrypted corresponds to the electronic signature to be generated. Even in this case, security can be kept high with respect to side channel attack, and a correction operation only needs to be conducted once. Alternatively, a correction operation is not required to be conducted depending upon the condition, so that it can be expected that an operation processing overhead is further reduced as a whole.

Figure 11:
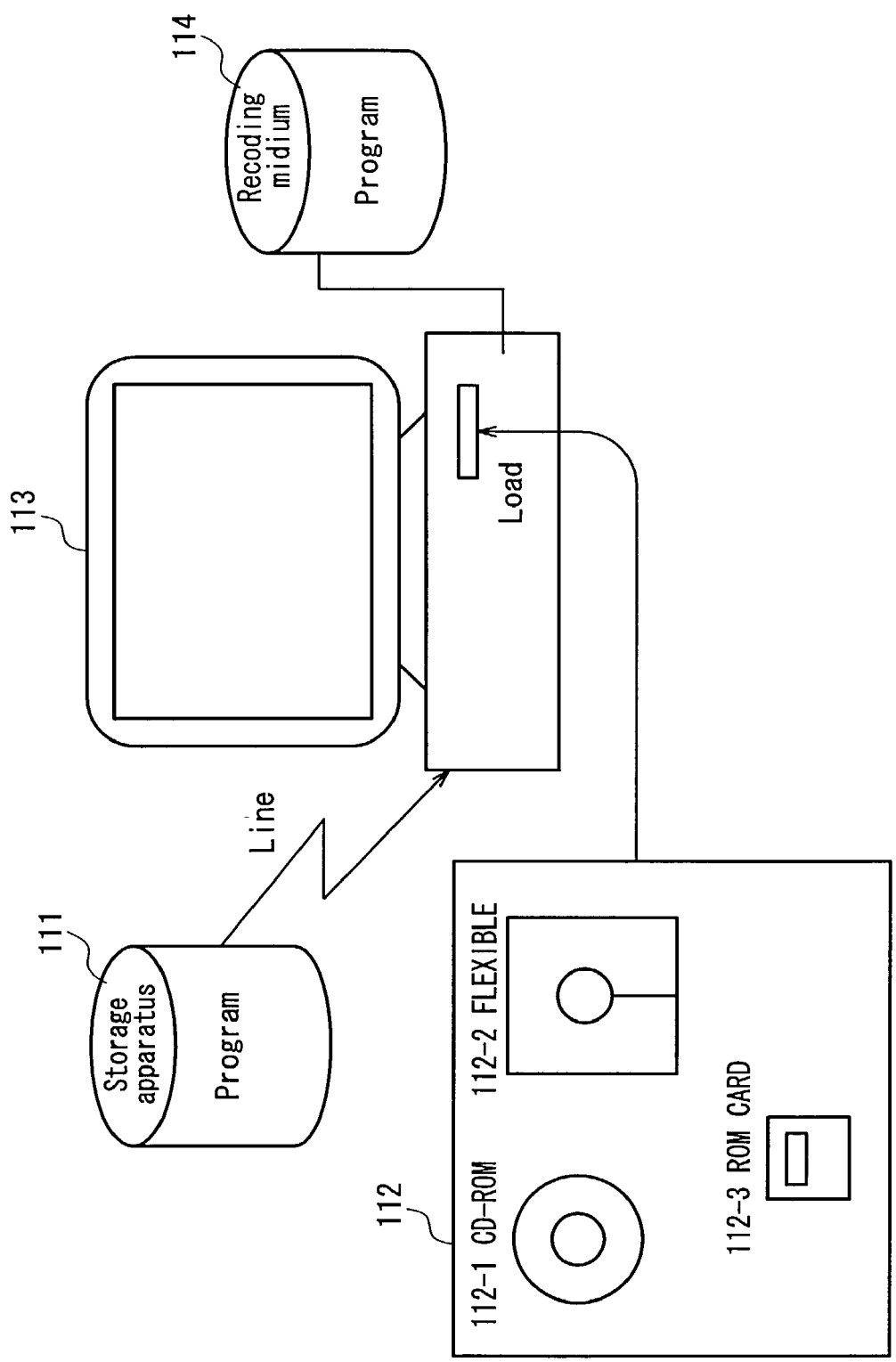
FIG. 11 illustrates a computer environment.

The program for realizing an encryption operating apparatus having side-channel attack resistance of the present embodiment according to the present invention may be stored not only in a portable recording medium 112 such as a CD-ROM 112-1, a flexible disk 112-2, and a ROM card (smart media, smart card) 112-3, but also in another storage apparatus 111 provided at the end of a communication line, a recording medium 114 such as a hard disk and a RAM of a computer 113, as shown in FIG. 11. In execution, the program is loaded and executed on a main memory.

Furthermore, correction data and the like generated by an encryption operating apparatus having side-channel attack resistance of the embodiments according to the present invention may also be stored not only in a portable recording medium 112 such as a CD-ROM 112-1, a flexible disk 112-2, and a ROM card (smart media, smart card) 112-3, but also in another storage apparatus 111 provided at the end of a communication line, a recording medium 114 such as a hard disk and a RAM of a computer 113, as shown in FIG. 11. Such correction data is read by the computer 113 when the encryption operating apparatus having side channel attack resistance according to the present invention is used.

As described above, in the encryption operating apparatus having side-channel attack resistance of the present invention, even in the case where any input is made, a remainder operation is always conducted. Alternatively, whether or not a remainder operation is conducted is determined based on the magnitude of numbers which are unknown to the third party. Therefore, the relationship in magnitude between the input value and the secret key p or q cannot be derived only based on the difference in operation processing time, waveform of power consumption, and the like. Thus, a decoding operating method having high security with respect to side-channel attack can be provided.

Furthermore, in the encryption operating apparatus having side-channel attack resistance of the present invention, a correction operation only needs to be conducted once. Alternatively, a correction operation is not required to be conducted depending upon the condition, so that it can be expected that an operation processing overhead is further reduced as a whole.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An encryption operating apparatus having side-channel attack resistance comprising a modular exponentiation operating part for conducting at least a modular exponentiation operation with respect to ciphertext X that can be decrypted with secret keys p, q and d,
   wherein plaintext Y before being encrypted is calculated by providing a correction operating part for conducting the modular exponentiation operation after multiplying the ciphertext X by an arbitrary constant having a value larger than the secret keys p and q, and finally conducting a correction operation based on the constant.

2. An encryption operating apparatus having side-channel attack resistance, comprising:
   a ciphertext input part for inputting ciphertext X that can be decrypted with secret keys p, q and d;
   a constant storing part for storing a constant C having relationships C>p and C>q with respect to the secret keys p and q;
   a correction value storing part for storing correction values $C^{-dp}$ and $C^{-dq}$ (dp=d mod (p−1), dq=d mod (q−1)) calculated based on the constant;
   a constant multiplying part for multiplying the ciphertext X by the constant C stored in the constant storing part;
   a multiplication result storing part for storing an operation result by the multiplication;
   a remainder operating part for conducting a remainder operation represented by Expression 104 using the secret key p or q as a remainder value with respect to the operation result by the multiplication stored in the multiplication result storing part;

$X_p' = X*C \bmod p$ $X_q' = X*C \bmod q$ (104)

a remainder operation result storing part for storing operation results $X_p'$ and $X_q'$ by the remainder operation;
   a Chinese remainder RSA processing part for conducting a modular exponentiation operation based on a Chinese remainder theorem represented by Expression 105 with respect to the operation results $X_p'$ and $X_q'$ by the remainder operation stored in the remainder operation result storing part;

$Y_p = X_p'^{dp} \bmod p$ $Y_q = X_q'^{dq} \bmod q$ (105)

a modular exponentiation operation result storing part for storing operation results $Y_p$ and $Y_q$ by the modular exponentiation operation;
   a correction processing part for conducting a correction operation represented by Expression 106 by using the correction value $C^{-dp}$ or $C^{-dq}$ stored in the correction value storing part with respect to the operation results $Y_p$ and $Y_q$ by the modular exponentiation operation stored in the modular exponentiation operation result storing part;

$Y_p' = Y_p * C^{-dp} \bmod p$ $Y_q' = Y_q * C^{-dq} \bmod q$ (106)

a correction result storing part for storing operation results $Y_p'$ and $Y_q'$ by the correction operation; and
   a plaintext output part for calculating plaintext Y before being encrypted as expressed by Expression 107 based on the operation results $Y_p'$ and $Y_q'$ by the correction operation stored in the correction result storing part, $Y = (a(Y_q' - Y_p') \bmod q)p + Y_p'$ (107)

where $a=p^{-1} \bmod q$ wherein, even in a case where any of the ciphertext X is input, the secret keys p and q cannot be revealed.

3. An encryption operating apparatus having side-channel attack resistance according to claim 2, further comprising a constant input part for inputting the constant C.

4. An encryption operating apparatus having side-channel attack resistance according to claim 2, further comprising a correction value operating part for obtaining the correction values $C^{-dp}$ and $C^{-dq}$ ($dp=d \bmod (p-1)$, $dq=d \bmod (q-1)$) based on the constant C.

5. An encryption operating apparatus having side-channel attack resistance according to claim 3, further comprising a correction value operating part for obtaining the correction values $C^{-dp}$ and $C^{-dq}$ ($dp=d \bmod (p-1)$, $dq=d \bmod (q-1)$) based on the constant C.

6. An encryption operating apparatus having side-channel attack resistance, comprising:

a ciphertext input part for inputting ciphertext X that can be decrypted with secret keys p, q and d;

a constant storing part for storing constants $C_p$ and $C_q$ having relationships $C_p > p$ and $C_q > q$ with respect to the secret keys p and q;

a correction value storing part for storing correction values $C_p^{-dp}$ and $C_q^{-dq}$ ($dp=d \bmod (p-1)$, $dq=d \bmod (q-1)$) calculated based on the constants;

a constant multiplying part for multiplying the ciphertext X by the constants $C_p$ and $C_q$ stored in the constant storing part;

a multiplication result storing part for storing an operation result by the multiplication;

a remainder operating part for conducting a remainder operation represented by Expression 108 using the secret key p or q as a remainder value with respect to the operation result by the multiplication stored in the multiplication result storing part;

$$X_p'=X*C_p \bmod p$$

$$X_q'=X*C_q \bmod q \quad (108)$$

a remainder operation result storing part for storing operation results $X_p'$ and $X_q'$ by the remainder operation;

a Chinese remainder RSA processing part for conducting a modular exponentiation operation based on a Chinese remainder theorem represented by Expression 109 with respect to the operation results $X_p'$ and $X_q'$ by the remainder operation stored in the remainder operation result storing part;

$$Y_p = X_p'^{dp} \bmod p$$

$$Y_q = X_q'^{dq} \bmod q \quad (109)$$

a modular exponentiation operation result storing part for storing operation results $Y_p$ and $Y_q$ by the modular exponentiation operation;

a correction processing part for conducting a correction operation represented by Expression 110 by using the correction value $C_p^{-dp}$ or $C_q^{-dq}$ stored in the correction value storing part with respect to the operation results $Y_p$ and $Y_q$ by the modular exponentiation operation stored in the modular exponentiation operation result storing part;

$$Y_p' = Y_p * C_p^{-dp} \bmod p$$

$$Y_q' = Y_q * C_q^{-dq} \bmod q \quad (110)$$

a correction result storing part for storing operation results $Y_p'$ and $Y_q'$ by the correction operation; and a plaintext output part for calculating plaintext Y before being encrypted as expressed by Expression 111 based on the operation results $Y_p'$ and $Y_q'$ by the correction operation stored in the correction result storing part, $$Y=(a(Y_q'-Y_p') \bmod q)p+Y_p' \quad (111)$$

where $a=p^{-1} \bmod q$ wherein, even in a case where any of the ciphertext X is input, the secret keys p and q cannot be revealed.

7. An encryption operating apparatus having side-channel attack resistance according to claim 6, further comprising a constant input part for inputting the constants $C_p$ and $C_q$.

8. An encryption operating apparatus having side-channel attack resistance according to claim 6, further comprising a correction value operating part for obtaining the correction values $C_p^{-dp}$ and $C_q^{-dq}$ ($dp=d \bmod (p-1)$, $dq=d \bmod (q-1)$) based on the constants $C_p$ and $C_q$.

9. An encryption operating apparatus having side-channel attack resistance according to claim 7, further comprising a correction value operating part for obtaining the correction values $C_p^{-dp}$ and $C_q^{-dq}$ ($dp=d \bmod (p-1)$, $dq=d \bmod (q-1)$) based on the constants $C_p$ and $C_q$.

10. An encryption operating apparatus having side-channel attack resistance comprising a modular exponentiation operating part for conducting at least a modular exponentiation operation with respect to ciphertext X that can be decrypted with secret keys p, q and d, wherein plaintext Y before being encrypted is calculated by multiplying the ciphertext X, using a Montgomery parameter having a value larger than the secret keys p and q, as a constant, and conducting the modular exponentiation operation.

11. An encryption operating apparatus having side-channel attack resistance, wherein, in a case where a function MONT_EXP for executing a Montgomery modular exponentiation operation is defined by Expression 112:

$R > p$ $$\text{MONT\_EXP}(X,d,R,p)=(X*R^{-1})^d \bmod p \quad (112)$$

the apparatus comprising:

a ciphertext input part for inputting ciphertext X that can be decrypted with secret keys p, q and d;

a Montgomery parameter multiplying part for multiplying the ciphertext X by a Montgomery parameter R;

a multiplication result storing part for storing an operation result by the multiplication;

a remainder operating part for conducting a remainder operation represented by Expression 113 using the secret key p or q as a remainder value with respect to the operation result by the multiplication stored in the multiplication result storing part;

$$X_p'=X*R \bmod p$$

$$X_q'=X*R \bmod q \quad (113)$$

a remainder operation result storing part for storing operation results $X_p'$ and $X_q'$ by the remainder operation;

a Montgomery modular exponentiation operating part for conducting a Montgomery modular exponentiation operation represented by Expression 114 with respect to the operation results $X_p'$ and $X_q'$ by the remainder operation stored in the remainder operation result storing part;

$$Y_p = \text{MONT\_EXP}(X_p',dp,R,p)$$

$$Y_q = \text{MONT\_EXP}(X_q',dq,R,q) \quad (114)$$

where dp=d mod(p−1), dq=d mod(q−1)

a Montgomery modular exponentiation operation result storing part for storing operation results $Y_p$ and $Y_q$ by the Montgomery modular exponentiation operation; and a plaintext output part for calculating plaintext Y before being encrypted as expressed by Expression 115 based on the operation results $Y_p$ and $Y_q$ by the Montgomery modular exponentiation operation stored in the Montgomery modular exponentiation operation result storing part, $$Y=(a(Y_q-Y_p)\bmod q)p+Y_p \qquad (115)$$

where $a=p^{-1}\bmod q$ wherein, even in a case where any of the ciphertext X is input, the secret keys p and q cannot be revealed.

12. An encryption operating apparatus having side-channel attack resistance, wherein, in a case where a function MONT_EXP for executing a Montgomery modular exponentiation operation is defined by Expression 116:

$$R>p$$

$$\mathrm{MONT\_EXP}(X,d,R,p)=(X*R^{-1})^d \bmod p \qquad (116)$$

the apparatus comprising:

a ciphertext input part for inputting ciphertext X that can be decrypted with secret keys p, q and d;

a Montgomery parameter multiplying part for multiplying the ciphertext X by a Montgomery parameter $R_p$ or $R_q$ having relationships $R_p>p$ and $R_q>q$ with respect to the secret keys p and q;

a multiplication result storing part for storing an operation result by the multiplication;

a remainder operating part for conducting a remainder operation represented by Expression 117 using the secret key p or q as a remainder value with respect to the operation result by the multiplication stored in the multiplication result storing part;

$$X_p'=X*R_p \bmod p$$

$$X_q'=X*R_q \bmod q \qquad (117)$$

a remainder operation result storing part for storing operation results $X_p'$ and $X_q'$ by the remainder operation;

a Montgomery modular exponentiation operating part for conducting a Montgomery modular exponentiation operation represented by Expression 118 with respect to the operation results $X_p'$ and $X_q'$ by the remainder operation stored in the remainder operation result storing part;

$$Y_p=\mathrm{MONT\_EXP}(X_p',dp,R_p,p)$$

$$Y_q=\mathrm{MONT\_EXP}(X_q',dq,R_q,q) \qquad (118)$$

where dp=d mod(p−1), dq=d mod(q−1)

a Montgomery modular exponentiation operation result storing part for storing operation results $Y_p$ and $Y_q$ by the Montgomery modular exponentiation operation; and a plaintext output part for calculating plaintext Y before being encrypted as expressed by Expression 119 based on the operation results $Y_p$ and $Y_q$ by the Montgomery modular exponentiation operation stored in the Montgomery modular exponentiation operation result storing part, $$Y=(a(Y_q-Y_p)\bmod q)p+Y_p \qquad (119)$$

where $a=p^{-1}\bmod q$ wherein, even in a case where any of the ciphertext X is input, the secret keys p and q cannot be revealed.

13. An encryption operating apparatus having side-channel attack resistance including a modular exponentiation operating part for conducting at least a modular exponentiation operation with respect to ciphertext X that can be decrypted with secret keys p, q and d, the apparatus comprising a Montgomery parameter remainder operating part for conducting a remainder operation to the secret keys p and q with respect to a Montgomery parameter having a value larger than the secret keys p and q, wherein plaintext Y before being encrypted is calculated by multiplying the ciphertext X by an operation result in the Montgomery parameter remainder operating part, and conducting the modular exponentiation operation.

14. An encryption operating apparatus having side-channel attack resistance, wherein, in a case where a function MONT_EXP for executing a Montgomery modular exponentiation operation is defined by Expression 120:

$$R>p$$

$$\mathrm{MONT\_EXP}(X,d,R,p)=(X*R^{-1})^d \bmod p \qquad (120)$$

the apparatus comprising:

a ciphertext input part for inputting ciphertext X that can be decrypted with secret keys p, q and d;

a Montgomery parameter remainder operation result storing part for storing a result obtained by conducting a remainder operation to a remainder value p or q as represented by Expression 121 with respect to a Montgomery parameter R;

$$R_p'=R \bmod p$$

$$R_q'=R \bmod q \qquad (121)$$

a remainder value multiplying part for multiplying the input ciphertext X by an operation result $R_p'$ or $R_q'$ by the remainder operation stored in the Montgomery parameter remainder operation result storing part as represented by Expression 122;

$$X_p'=X*R_p'$$

$$X_q'=X*R_q' \qquad (122)$$

a multiplication result storing part for storing operation results $X_p'$ and $X_q'$ by the multiplication;

a remainder operating part for successively conducting a remainder operation represented by Expression 123 using the secret keys p and q as remainder values with respect to the operation results $X_p'$ and $X_q'$ by the multiplication stored in the multiplication result storing part;

$$X_p=X_p' \bmod p$$

$$X_q=X_q' \bmod q \qquad (123)$$

a remainder operation result storing part for storing operation results $X_p$ and $X_q$ by the remainder operation;

a Montgomery modular exponentiation operating part for conducting a Montgomery modular exponentiation operation represented by Expression 124 with respect to the operation results $X_p$ and $X_q$ by the remainder operation stored in the remainder operation result storing part;

$$Y_p = \text{MONT\_EXP}(X_p, dp, R, p)$$

$$Y_q = \text{MONT\_EXP}(X_q, dq, R, q) \tag{124}$$

where dp=d mod(p−1), dq=d mod(q−1)

a Montgomery modular exponentiation operation result storing part for storing operation results $Y_p$ and $Y_q$ by the Montgomery modular exponentiation operation; and a plaintext output part for calculating plaintext Y before being encrypted as expressed by Expression 125 based on the operation results $Y_p$ and $Y_q$ by the Montgomery modular exponentiation operation stored in the Montgomery modular exponentiation operation result storing part, $$Y = (a(Y_q - Y_p) \bmod q)p + Y_p \tag{125}$$

where $a = p^{-1} \bmod q$ wherein, even in a case where any of the ciphertext X is input, the secret keys p and q cannot be revealed.

15. An encryption operating apparatus having side-channel attack resistance according to claim 14, further comprising a Montgomery parameter remainder operating part for conducting a remainder operation to the remainder value p or q as represented by Expression 126 with respect to the Montgomery parameter R $$R_p' = R \bmod p$$

$$R_q' = R \bmod q \tag{126}.$$

16. An encryption operating apparatus having side-channel attack resistance, wherein, in a case where a function MONT_EXP for executing a Montgomery modular exponentiation operation is defined by Expression 127:

$$R > p$$

$$\text{MONT\_EXP}(X, d, R, p) = (X * R^{-1})^d \bmod p \tag{127}$$

the apparatus comprising:

a ciphertext input part for inputting ciphertext X that can be decrypted with secret keys p, q and d;

a Montgomery parameter remainder operation result storing part for storing a result obtained by conducting a remainder operation to a remainder value p or q as represented by Expression 128 with respect to a Montgomery parameter $R_p$ or $R_q$ having relationships $R_p > p$ and $R_q > q$ with respect to the secret keys p and q;

$$R_p' = R_p \bmod p$$

$$R_q' = R_q \bmod q \tag{128}$$

a remainder value multiplying part for multiplying the input ciphertext X by an operation result $R_p'$ or $R_q'$ by the remainder operation stored in the Montgomery parameter remainder operation result storing part as represented by Expression 129;

$$X_p' = X * R_p'$$

$$X_q' = X * R_q' \tag{129}$$

a multiplication result storing part for storing operation results $X_p'$ and $X_q'$ by the multiplication;

a remainder operating part for successively conducting a remainder operation represented by Expression 130 using the secret keys p and q as remainder values with respect to the operation results $X_p'$ and $X_q'$ by the multiplication stored in the multiplication result storing part;

$$X_p = X_p' \bmod p$$

$$X_q = X_q' \bmod q \tag{130}$$

a remainder operation result storing part for storing operation results $X_p$ and $X_q$ by the remainder operation;

a Montgomery modular exponentiation operating part for conducting a Montgomery modular exponentiation operation represented by Expression 131 with respect to the operation results $X_p$ and $X_q$ by the remainder operation stored in the remainder operation result storing part;

$$Y_p = \text{MONT\_EXP}(X_p, dp, R_p, p)$$

$$Y_q = \text{MONT\_EXP}(X_q, dq, R_q, q) \tag{131}$$

where dp=d mod(p−1), dq=d mod(q−1)

a Montgomery modular exponentiation operation result storing part for storing operation results $Y_p$ and $Y_q$ by the Montgomery modular exponentiation operation; and a plaintext output part for calculating plaintext Y before being encrypted as expressed by Expression 132 based on the operation results $Y_p$ and $Y_q$ by the Montgomery modular exponentiation operation stored in the Montgomery modular exponentiation operation result storing part, $$Y = (a(Y_q - Y_p) \bmod q)p + Y_p \tag{132}$$

where $a = p^{-1} \bmod q$ wherein, even in a case where any of the ciphertext X is input, the secret keys p and q cannot be revealed.

17. An encryption operating apparatus having side-channel attack resistance according to claim 16, further comprising a Montgomery parameter remainder operating part for conducting a remainder operation to the remainder value p or q as represented by Expression 133 with respect to the Montgomery parameters $R_p$ and $R_q$ $$R_p' = R_p \bmod p$$

$$R_q' = R_q \bmod q \tag{133}.$$

18. An encryption operating method having side-channel attack resistance comprising at least a modular exponentiation operation with respect to ciphertext X that can be decrypted with secret keys p, q and d, wherein plaintext Y before being encrypted is calculated by conducting the modular exponentiation operation after multiplying the ciphertext X by an arbitrary constant having a value larger than the secret keys p and q, and finally conducting a correction operation based on the constant.

19. An encryption operating method having side-channel attack resistance, comprising:

inputting ciphertext X that can be decrypted with secret keys p, q and d;

storing a constant C having relationships C>p and C>q with respect to the secret keys p and q;

storing correction values $C^{-dP}$ and $C^{-dq}$ (dp=d mod (p−1), dq=d mod (q−1)) calculated based on the constant;

multiplying the ciphertext X by the stored constant C;

storing an operation result by the multiplication;

conducting a remainder operation represented by Expression 134 using the secret key p or q as a remainder value with respect to the stored operation result by the multiplication;

$$X_p'=X*C \bmod p$$

$$X_q'=X*C \bmod q \tag{134}$$

storing operation results $X_p'$ and $X_q'$ by the remainder operation;

conducting a modular exponentiation operation based on a Chinese remainder theorem represented by Expression 135 with respect to the stored operation results $X_p'$ and $X_q'$ by the remainder operation;

$$Y_p=X_p'^{dp} \bmod p$$

$$Y_q=X_q'^{dq} \bmod q \tag{135}$$

storing operation results $Y_p$ and $Y_q$ by the modular exponentiation operation;

conducting a correction operation represented by Expression 136 by using the stored correction value $C^{-dp}$ or $C^{-dq}$ with respect to the stored operation results $Y_p$ and $Y_q$ by the modular exponentiation operation;

$$Y_p'=Y_p*C^{-dp} \bmod p$$

$$Y_q'=Y_q*C^{-dq} \bmod q \tag{136}$$

storing operation results $Y_p'$ and $Y_q'$ by the correction operation; and calculating plaintext Y before being encrypted as expressed by Expression 137 based on the stored operation results $Y_p'$ and $Y_q'$ by the correction operation, $$Y=(a(Y_q'-Y_p') \bmod q)p+Y_p' \tag{137}$$

where $a=p^{-1} \bmod q$ wherein, even in a case where any of the ciphertext X is input, the secret keys p and q cannot be revealed.

20. An encryption operating method having side-channel attack resistance, comprising:
  inputting ciphertext X that can be decrypted with secret keys p, q and d;
  storing constants $C_p$ and $C_q$ having relationships $C_p>p$ and $C_q>q$ with respect to the secret keys p and q;
  storing correction values $C_p^{-dp}$ and $C_q^{-dq}$ (dp=d mod (p−1), dq=d mod (q−1)) calculated based on the constants;
  multiplying the ciphertext X by the stored constant $C_p$ or $C_q$;
  storing an operation result by the multiplication;
  conducting a remainder operation represented by Expression 138 using the secret key p or q as a remainder value with respect to the stored operation result by the multiplication;

$$X_p'=X*C_p \bmod p$$

$$X_q'=X*C_q \bmod q \tag{138}$$

storing operation results $X_p'$ and $X_q'$ by the remainder operation;

conducting a modular exponentiation operation based on a Chinese remainder theorem represented by Expression 139 with respect to the stored operation results $X_p'$ and $X_q'$ by the remainder operation;

$$Y_p=X_p'^{dp} \bmod p$$

$$Y_q=X_q'^{dq} \bmod q \tag{139}$$

storing operation results $Y_p$ and $Y_q$ by the modular exponentiation operation;

conducting a correction operation represented by Expression 140 by using the stored correction value $C_p^{-dp}$ or $C_q^{-dq}$ with respect to the stored operation results $Y_p$ and $Y_q$ by the modular exponentiation operation;

$$Y_p'=Y_p*C_p^{-dp} \bmod p$$

$$Y_q'=Y_q*C_q^{-dq} \bmod q \tag{140}$$

storing operation results $Y_p'$ and $Y_q'$ by the correction operation; and calculating plaintext Y before being encrypted as expressed by Expression 141 based on the stored operation results $Y_p'$ and $Y_q'$ by the correction operation, $$Y=(a(Y_q'-Y_p') \bmod q)p+Y_p' \tag{141}$$

where $a=p^{-1} \bmod q$ wherein, even in a case where any of the ciphertext X is input, the secret keys p and q cannot be revealed.

21. An encryption operating method having side-channel attack resistance comprising at least a modular exponentiation operation with respect to ciphertext X that can be decrypted with secret keys p, q and d,
  wherein plaintext Y before being encrypted is calculated by multiplying the ciphertext X, using a Montgomery parameter having a value larger than the secret keys p and q, as a constant, and conducting the modular exponentiation operation.

22. An encryption operating method having side-channel attack resistance, wherein, in a case where a function MONT_EXP for executing a Montgomery modular exponentiation operation is defined by Expression 142:

$$R>p$$

$$\text{MONT\_EXP}(X,d,R,p)=(X*R^{-1})^d \bmod p \tag{142}$$

the method comprising:
  inputting ciphertext X that can be decrypted with secret keys p, q and d;
  multiplying the ciphertext X by a Montgomery parameter R;
  storing an operation result by the multiplication;
  conducting a remainder operation represented by Expression 143 using the secret key p or q as a remainder value with respect to the stored operation result by the multiplication;

$$X_p'=X*R \bmod p$$

$$X_q'=X*R \bmod q \tag{143}$$

storing operation results $X_p'$ and $X_q'$ by the remainder operation;

conducting a Montgomery modular exponentiation operation represented by Expression 144 with respect to the stored operation results $X_p'$ and $X_q'$ by the remainder operation;

$$Y_p=\text{MONT\_EXP}(X_p',dp,R,p)$$

$$Y_q=\text{MONT\_EXP}(X_q',dq,R,q) \tag{144}$$

where dp=d mod(p−1), dq=d mod(q−1)

storing operation results $Y_p$ and $Y_q$ by the Montgomery modular exponentiation operation; and calculating plaintext Y before being encrypted as expressed by Expression 145 based on the stored operation results $Y_p$ and $Y_q$ by the Montgomery modular exponentiation operation, $$Y=(a(Y_q-Y_p) \bmod q)p+Y_p \quad (145)$$

where $a=p^{-1} \bmod q$ wherein, even in a case where any of the ciphertext X is input, the secret keys p and q cannot be revealed.

23. An encryption operating method having side-channel attack resistance, wherein, in a case where a function MONT_EXP for executing a Montgomery modular exponentiation operation is defined by Expression 146:

$R>p$ $$\text{MONT\_EXP}(X,d,R,p)=(X*R^{-1})^d \bmod p \quad (146)$$

the method comprising:

inputting ciphertext X that can be decrypted with secret keys p, q and d;

multiplying the ciphertext X by a Montgomery parameter $R_p$ or $R_q$ having relationships $R_p>p$ and $R_q>q$ with respect to the secret keys p and q;

storing an operation result by the multiplication;

conducting a remainder operation represented by Expression 147 using the secret key p or q as a remainder value with respect to the stored operation result by the multiplication;

$$X_p'=X*R_p \bmod p$$
$$X_q'=X*R_q \bmod q \quad (147)$$

storing operation results $X_p'$ and $X_q'$ by the remainder operation;

conducting a Montgomery modular exponentiation operation represented by Expression 148 with respect to the stored operation results $X_p'$ and $X_q'$ by the remainder operation;

$$Y_p=\text{MONT\_EXP}(X_p',dp,R_p,p)$$
$$Y_q=\text{MONT\_EXP}(X_q',dq,R_q,q) \quad (148)$$

where $dp=d \bmod (p-1)$, $dq=d \bmod (q-1)$ storing operation results $Y_p$ and $Y_q$ by the Montgomery modular exponentiation operation; and calculating plaintext Y before being encrypted as expressed by Expression 149 based on the stored operation results $Y_p$ and $Y_q$ by the Montgomery modular exponentiation operation, $$Y=(a(Y_q-Y_p) \bmod q)p+Y_p \quad (149)$$

where $a=p^{-1} \bmod q$ wherein, even in a case where any of the ciphertext X is input, the secret keys p and q cannot be revealed.

24. An encryption operating method having side-channel attack resistance including at least a modular exponentiation operation with respect to ciphertext X that can be decrypted with secret keys p, q and d, the method comprising conducting a remainder operation to the secret keys p and q with respect to a Montgomery parameter having a value larger than the secret keys p and q, wherein plaintext Y before being encrypted is calculated by multiplying the ciphertext X by an operation result in the remainder operation, and conducting the modular exponentiation operation.

25. An encryption operating method having side-channel attack resistance, wherein, in a case where a function MON- T_EXP for executing a Montgomery modular exponentiation operation is defined by Expression 150:

$R>p$ $$\text{MONT\_EXP}(X,d,R,p)=(X*R^{-1})^d \bmod p \quad (150)$$

the method comprising:

inputting ciphertext X that can be decrypted with secret keys p, q and d;

storing a result obtained by conducting a remainder operation to a remainder value p or q as represented by Expression 151 with respect to a Montgomery parameter R;

$$R_p'=R \bmod p$$
$$R_q'=R \bmod q \quad (151)$$

multiplying the input ciphertext X by a stored operation result $R_p'$ or $R_q'$ by the remainder operation as represented by Expression 152;

$$X_p'=X*R_p'$$
$$X_q'=X*R_q' \quad (152)$$

storing operation results $X_p'$ and $X_q'$ by the multiplication;

successively conducting a remainder operation represented by Expression 153 using the secret keys p and q as remainder values with respect to the stored operation results $X_p'$ and $X_q'$ by the multiplication;

$$X_p=X_p' \bmod p$$
$$X_q=X_q' \bmod q \quad (153)$$

storing operation results $X_p$ and $X_q$ by the remainder operation;

conducting a Montgomery modular exponentiation operation represented by Expression 154 with respect to the stored operation results $X_p$ and $X_q$ by the remainder operation;

$$Y_p=\text{MONT\_EXP}(X_p,dp,R,p)$$
$$Y_q=\text{MONT\_EXP}(X_q,dq,R,q) \quad (154)$$

where $dp=d \bmod (p-1)$, $dq=d \bmod (q-1)$ storing operation results $Y_p$ and $Y_q$ by the Montgomery modular exponentiation operation; and calculating plaintext Y before being encrypted as expressed by Expression 155 based on the stored operation results $Y_p$ and $Y_q$ by the Montgomery modular exponentiation operation, $$Y=(a(Y_q-Y_p) \bmod q)p+Y_p \quad (155)$$

where $a=p^{-1} \bmod q$ wherein, even in a case where any of the ciphertext X is input, the secret keys p and q cannot be revealed.

26. An encryption operating method having side-channel attack resistance, wherein, in a case where a function MONT_EXP for executing a Montgomery modular exponentiation operation is defined by Expression 156:

$R>p$ $$\text{MONT\_EXP}(X,d,R,p)=(X*R^{-1})^d \bmod p \quad (156)$$

the method comprising:

inputting ciphertext X that can be decrypted with secret keys p, q and d;

storing a result obtained by conducting a remainder operation to the remainder value p or q as represented by Expression 157 with respect to a Montgomery parameter $R_p$ or $R_q$ having relationships $R_p>p$ and $R_q>q$ with respect to the secret keys p and q;

$$R_p'=R_p \bmod p$$

$$R_q'=R_q \bmod q \quad (157)$$

multiplying the input ciphertext X by a stored operation result $R_p'$ or $R_q'$ by the remainder operation as represented by Expression 158;

$$X_p'=X*R_p'$$

$$X_q'=X*R_q' \quad (158)$$

storing operation results $X_p'$ and $X_q'$ by the multiplication;

successively conducting a remainder operation represented by Expression 159 using the secret keys p and q as remainder values with respect to the stored operation results $X_p'$ and $X_q'$ by the multiplication;

$$X_p=X_p' \bmod p$$

$$X_q=X_q' \bmod q \quad (159)$$

storing operation results $X_p$ and $X_q$ by the remainder operation;

conducting a Montgomery modular exponentiation operation represented by Expression 160 with respect to the stored operation results $X_p$ and $X_q$ by the remainder operation;

$$Y_p=\text{MONT\_EXP}(X_p, dp, R_p, p)$$

$$Y_q=\text{MONT\_EXP}(X_q, dq, R_q, q) \quad (160)$$

where $dp=d \bmod (p-1)$, $dq=d \bmod (q-1)$ storing operation results $Y_p$ and $Y_q$ by the Montgomery modular exponentiation operation; and calculating plaintext Y before being encrypted as expressed by Expression 161 based on the stored operation results $Y_p$ and $Y_q$ by the Montgomery modular exponentiation operation, $$Y=(a(Y_q-Y_p) \bmod q)p+Y_p \quad (161)$$

where $a=p^{-1} \bmod q$ wherein, even in a case where any of the ciphertext X is input, the secret keys p and q cannot be revealed.

27. A recording medium storing a computer-executable program for implementing an encryption operating method having side-channel attack resistance comprising at least a modular exponentiation operation with respect to ciphertext X that can be decrypted with secret keys p, q and d, wherein plaintext Y before being encrypted is calculated by conducting the modular exponentiation operation after multiplying the ciphertext X by an arbitrary constant having a value larger than the secret keys p and q, and finally conducting a correction operation based on the constant.

28. A recording medium storing a computer-executable program for implementing an encryption operating method having side-channel attack resistance, the program comprising:

inputting ciphertext X that can be decrypted with secret keys p, q and d;

storing a constant C having relationships C>p and C>q with respect to the secret keys p and q;

storing correction values $C^{-dp}$ and $C^{-dq}$ ($dp=d \bmod (p-1)$, $dq=d \bmod (q-1)$) calculated based on the constant;

multiplying the ciphertext X by the stored constant C;

storing an operation result by the multiplication;

conducting a remainder operation represented by Expression 162 using the secret key p or q as a remainder value with respect to the stored operation result by the multiplication;

$$X_p'=X*C \bmod p$$

$$X_q'=X*C \bmod q \quad (162)$$

storing operation results $X_p'$ and $X_q'$ by the remainder operation;

conducting a modular exponentiation operation based on a Chinese remainder theorem represented by Expression 163 with respect to the stored operation results $X_p'$ and $X_q'$ by the remainder operation;

$$Y_p=X_p'^{dp} \bmod p$$

$$Y_q=X_q'^{dq} \bmod q \quad (163)$$

storing operation results $Y_p$ and $Y_q$ by the modular exponentiation operation;

conducting a correction operation represented by Expression 164 by using the stored correction value $C^{-dp}$ or $C^{-dq}$ with respect to the stored operation results $Y_p$ and $Y_q$ by the modular exponentiation operation;

$$Y_p'=Y_p*C^{-dp} \bmod p$$

$$Y_q'=Y_q*C^{-dq} \bmod q \quad (164)$$

storing operation results $Y_p'$ and $Y_q'$ by the correction operation; and calculating plaintext Y before being encrypted as expressed by Expression 165 based on the stored operation results $Y_p'$ and $Y_q'$ by the correction operation, $$Y=(a(Y_q'-Y_p') \bmod q)p+Y_p' \quad (165)$$

where $a=p^{-1} \bmod q$ wherein, even in a case where any of the ciphertext X is input, the secret keys p and q cannot be revealed.

29. A recording medium storing a computer-executable program for implementing an encryption operating method having side-channel attack resistance, the program comprising:

inputting ciphertext X that can be decrypted with secret keys p, q and d;

storing constants $C_p$ and $C_q$ having relationships $C_p>p$ and $C_q>q$ with respect to the secret keys p and q;

storing correction values $C_p^{-dp}$ and $C_q^{-dq}$ ($dp=d \bmod (p-1)$, $dq=d \bmod (q-1)$) calculated based on the constants;

multiplying the ciphertext X by the stored constant $C_p$ or $C_q$;

storing an operation result by the multiplication;

conducting a remainder operation represented by Expression 166 using the secret key p or q as a remainder value with respect to the stored operation result by the multiplication;

$$X_p'=X*C_p \bmod p$$

$$X_q'=X*C_q \bmod q \quad (166)$$

storing operation results $X_p'$ and $X_q'$ by the remainder operation;

conducting a modular exponentiation operation based on a Chinese remainder theorem represented by Expression 167 with respect to the stored operation results $X_p'$ and $X_q'$ by the remainder operation;

$$Y_p = X_p'^{dp} \bmod p$$

$$Y_q = X_q'^{dq} \bmod q \tag{167}$$

storing operation results $Y_p$ and $Y_q$ by the modular exponentiation operation;

conducting a correction operation represented by Expression 168 by using the stored correction value $C_p^{-dp}$ or $C_q^{-dq}$ with respect to the stored operation results $Y_p$ and $Y_q$ by the modular exponentiation operation;

$$Y_p' = Y_p * C_p^{-dp} \bmod p$$

$$Y_q' = Y_q * C_q^{-dq} \bmod q \tag{168}$$

storing operation results $Y_p'$ and $Y_q'$ by the correction operation; and calculating plaintext Y before being encrypted as expressed by Expression 169 based on the stored operation results $Y_p'$ and $Y_q'$ by the correction operation, $$Y = (a(Y_q' - Y_p') \bmod q)p + Y_p' \tag{169}$$

where $a = p^{-1} \bmod q$ wherein, even in a case where any of the ciphertext X is input, the secret keys p and q cannot be revealed.

30. A recording medium storing a computer-executable program for implementing an encryption operating method having side-channel attack resistance comprising at least a modular exponentiation operation with respect to ciphertext X that can be decrypted with secret keys p, q and d, wherein plaintext Y before being encrypted is calculated by multiplying the ciphertext X, using a Montgomery parameter having a value larger than the secret keys p and q, as a constant, and conducting the modular exponentiation operation.

31. A recording medium storing a computer-executable program for implementing an encryption operating method having side-channel attack resistance, wherein, in a case where a function MONT_EXP for executing a Montgomery modular exponentiation operation is defined by Expression 170:

$$R > p$$

$$\text{MONT\_EXP}(X, d, R, p) = (X * R^{-1})^d \bmod p \tag{170}$$

the program comprising:

inputting ciphertext X that can be decrypted with secret keys p, q and d;

multiplying the ciphertext X by a Montgomery parameter R;

storing an operation result by the multiplication;

conducting a remainder operation represented by Expression 171 using the secret key p or q as a remainder value with respect to the stored operation result by the multiplication;

$$X_p' = X * R \bmod p$$

$$X_q' = X * R \bmod q \tag{171}$$

storing operation results $X_p'$ and $X_q'$ by the remainder operation;

conducting a Montgomery modular exponentiation operation represented by Expression 172 with respect to the stored operation results $X_p'$ and $X_q'$ by the remainder operation;

$$Y_p = \text{MONT\_EXP}(X_p', dp, R, p)$$

$$Y_q = \text{MONT\_EXP}(X_q', dq, R, q) \tag{172}$$

where $dp = d \bmod (p-1)$, $dq = d \bmod (q-1)$ storing operation results $Y_p$ and $Y_q$ by the Montgomery modular exponentiation operation; and calculating plaintext Y before being encrypted as expressed by Expression 173 based on the stored operation results $Y_p$ and $Y_q$ by the Montgomery modular exponentiation operation, $$Y = (a(Y_q' - Y_p') \bmod q)p + Y_p' \tag{173}$$

where $a = p^{-1} \bmod q$ wherein, even in a case where any of the ciphertext X is input, the secret keys p and q cannot be revealed.

32. A recording medium storing a computer-executable program for implementing an encryption operating method having side-channel attack resistance, wherein, in a case where a function MONT_EXP for executing a Montgomery modular exponentiation operation is defined by Expression 174:

$$R > p$$

$$\text{MONT\_EXP}(X, d, R, p) = (X * R^{-1})^d \bmod p \tag{174}$$

the program comprising:

inputting ciphertext X that can be decrypted with secret keys p, q and d;

multiplying the ciphertext X by a Montgomery parameter $R_p$ or $R_q$ having relationships $R_p > p$ and $R_q > q$ with respect to the secret keys p and q;

storing an operation result by the multiplication;

conducting a remainder operation represented by Expression 175 using the secret key p or q as a remainder value with respect to the stored operation result by the multiplication;

$$X_p' = X * R_p \bmod p$$

$$X_q' = X * R_q \bmod q \tag{175}$$

storing operation results $X_p'$ and $X_q'$ by the remainder operation;

conducting a Montgomery modular exponentiation operation represented by Expression 176 with respect to the stored operation results $X_p'$ and $X_q'$ by the remainder operation;

$$Y_p = \text{MONT\_EXP}(X_p', dp, R_p, p)$$

$$Y_q = \text{MONT\_EXP}(X_q', dq, R_q, q) \tag{176}$$

where $dp = d \bmod (p-1)$, $dq = d \bmod (q-1)$ storing operation results $Y_p$ and $Y_q$ by the Montgomery modular exponentiation operation; and calculating plaintext Y before being encrypted as expressed by Expression 177 based on the stored operation results $Y_p$ and $Y_q$ by the Montgomery modular exponentiation operation, $$Y = (a(Y_q' - Y_p') \bmod q)p + Y_p' \tag{177}$$

where $a = p^{-1} \bmod q$ wherein, even in a case where any of the ciphertext X is input, the secret keys p and q cannot be revealed.

33. A recording medium storing a computer-executable program for implementing an encryption operating method having side-channel attack resistance including at least a modular exponentiation operation with respect to ciphertext X that can be decrypted with secret keys p, q and d, the program comprising conducting a remainder operation to the secret keys p and q with respect to a Montgomery parameter having a value larger than the secret keys p and q, wherein plaintext Y before being encrypted is calculated by multiplying the ciphertext X by an operation result in the remainder operation, and conducting the modular exponentiation operation.

34. A recording medium storing a computer-executable program for implementing an encryption operating method having side-channel attack resistance, wherein, in a case where a function MONT_EXP for executing a Montgomery modular exponentiation operation is defined by Expression 178:

$R > p$ $$MONT\_EXP(X,d,R,p) = (X*R^{-1})^d \bmod p \tag{178}$$

the program comprising:

inputting ciphertext X that can be decrypted with secret keys p, q and d;

storing a result obtained by conducting a remainder operation to a remainder value p or q as represented by Expression 179 with respect to a Montgomery parameter R;

$R_p' = R \bmod p$ $$R_q' = R \bmod q \tag{179}$$

multiplying the input ciphertext X by a stored operation result $R_p'$ or $R_q'$ by the remainder operation as represented by Expression 180;

$X_p' = X*R_p'$ $$X_q' = X*R_q' \tag{180}$$

storing operation results $X_p'$ and $X_q'$ by the multiplication;

successively conducting a remainder operation represented by Expression 181 using the secret keys p and q as remainder values with respect to the stored operation results $X_p'$ and $X_q'$ by the multiplication;

$X_p = X_p' \bmod p$ $$X_q = X_q' \bmod q \tag{181}$$

storing operation results $X_p$ and $X_q$ by the remainder operation;

conducting a Montgomery modular exponentiation operation represented by Expression 182 with respect to the stored operation results $X_p$ and $X_q$ by the remainder operation;

$Y_p = MONT\_EXP(X_p,dp,R,p)$ $$Y_q = MONT\_EXP(X_q,dq,R,q) \tag{182}$$

where dp=d mod(p−1), dq=d mod(q−1)

storing operation results $Y_p$ and $Y_q$ by the Montgomery modular exponentiation operation; and calculating plaintext Y before being encrypted as expressed by Expression 183 based on the stored operation results $Y_p$ and $Y_q$ by the Montgomery modular exponentiation operation, $$Y = (a(Y_q - Y_p) \bmod q)p + Y_p \tag{183}$$

where $a = p^{-1} \bmod q$ wherein, even in a case where any of the ciphertext X is input, the secret keys p and q cannot be revealed.

35. A recording medium storing a computer-executable program for implementing an encryption operating method having side-channel attack resistance, wherein, in a case where a function MONT_EXP for executing a Montgomery modular exponentiation operation is defined by Expression 184:

$R > p$ $$MONT\_EXP(X,d,R,p) = (X*R^{-1})^d \bmod p \tag{184}$$

the program comprising:

inputting ciphertext X that can be decrypted with secret keys p, q and d;

storing a result obtained by conducting a remainder operation to the remainder value p or q as represented by Expression 185 with respect to a Montgomery parameter $R_p$ or $R_q$ having relationships $R_p > p$ and $R_q > q$ with respect to the secret keys p and q;

$R_p' = R_p \bmod p$ $$R_q' = R_q \bmod q \tag{185}$$

multiplying the input ciphertext X by a stored operation result $R_p'$ or $R_q'$ by the remainder operation as represented by Expression 186;

$X_p' = X*R_p'$ $$X_q' = X*R_q' \tag{186}$$

storing operation results $X_p'$ and $X_q'$ by the multiplication;

successively conducting a remainder operation represented by Expression 187 using the secret keys p and q as remainder values with respect to the stored operation results $X_p'$ and $X_q'$ by the multiplication;

$X_p = X_p' \bmod p$ $$X_q = X_q' \bmod q \tag{187}$$

storing operation results $X_p$ and $X_q$ by the remainder operation;

conducting a Montgomery modular exponentiation operation represented by Expression 188 with respect to the stored operation results $X_p$ and $X_q$ by the remainder operation;

$Y_p = MONT\_EXP(X_p,dp,R_p,p)$ $$Y_q = MONT\_EXP(X_q,dq,R_q,q) \tag{188}$$

where dp=d mod(p−1), dq=d mod(q−1)

storing operation results $Y_p$ and $Y_q$ by the Montgomery modular exponentiation operation; and calculating plaintext Y before being encrypted as expressed by Expression 189 based on the stored operation results $Y_p$ and $Y_q$ by the Montgomery modular exponentiation operation, $$Y = (a(Y_q - Y_p) \bmod q)p + Y_p \tag{189}$$

where $a = p^{-1} \bmod q$ wherein, even in a case where any of the ciphertext X is input, the secret keys p and q cannot be revealed.

* * * * *

UNITED STATES PATENT AND TRADEMARK OFFICE
CERTIFICATE OF CORRECTION

| | | |
|---|---|---|
| PATENT NO. | : 7,065,788 B2 | Page 1 of 1 |
| APPLICATION NO. | : 10/278838 | |
| DATED | : June 20, 2006 | |
| INVENTOR(S) | : Jun Yajima et al. | |

It is certified that error appears in the above-identified patent and that said Letters Patent is hereby corrected as shown below:

TITLE PAGE, Column 2 (Other Publications), Line 16, change "1985pp." to --1985, pp.--

Signed and Sealed this

Twelfth Day of December, 2006

JON W. DUDAS
*Director of the United States Patent and Trademark Office*